US011113044B2

(12) United States Patent
Ogura et al.

(10) Patent No.: US 11,113,044 B2
(45) Date of Patent: Sep. 7, 2021

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Takeshi Ogura, Kanagawa (JP); Toru Nakatani, Kanagawa (JP); Koji Hashimoto, Kanagawa (JP); Haruki Matsui, Kanagawa (JP); Aiko Nozue, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 100 days.

(21) Appl. No.: 16/208,573

(22) Filed: Dec. 4, 2018

(65) Prior Publication Data

US 2019/0212996 A1 Jul. 11, 2019

(30) Foreign Application Priority Data

Jan. 11, 2018 (JP) .............................. JP2018-002295

(51) Int. Cl.
*G06F 9/44* (2018.01)
*G06F 3/0483* (2013.01)
(Continued)

(52) U.S. Cl.
CPC .............. *G06F 8/62* (2013.01); *G06F 3/1203* (2013.01); *G06F 3/123* (2013.01); *G06F 8/61* (2013.01);
(Continued)

(58) Field of Classification Search
CPC ..... G06F 8/62; G06F 8/61; G06F 8/65; G06F 8/71; G06F 8/60; G06F 3/1203;
(Continued)

(56) References Cited

U.S. PATENT DOCUMENTS 7,293,268 B2 * 11/2007 Masuda .................... G06F 8/60
717/168
7,620,948 B1 * 11/2009 Rowe ........................ G06F 8/65
717/171
(Continued)

FOREIGN PATENT DOCUMENTS

JP         2005128593        5/2005

OTHER PUBLICATIONS

George Pallis et al., effective Keyword Search for Software Resources installed in Large-scale Grid Infrastructures, 2009 IEEE, [Retrieved on Apr. 28, 2021]. Retrieved from the internet: <URL: https://dl.acm.org/doi/pdf/10.1109/WI-IAT.2009.82> 8 Pages (482-489) (Year: 2009).*

(Continued)

*Primary Examiner* — Anibal Rivera
(74) *Attorney, Agent, or Firm* — JCIPRNET

(57) ABSTRACT

An information processing apparatus includes a display unit that displays a first list which is a list of available software and a second list which is a list of software installed on a target device; and a receiving unit that receives an instruction operation of installing the software displayed in the first list on the target device and an instruction operation of performing a predetermined process on the installed software displayed in the second list, in which the display unit continues to display the software in the second list, in a case where the software included in the second list is no longer newly provided, and the display unit does not display the software in the first list or displays a fact that it is not allowed to install the software, in a case where the software included in the first list is no longer newly provided.

14 Claims, 14 Drawing Sheets

(51) Int. Cl.
*G06F 9/445* (2018.01)
*G06F 8/61* (2018.01)
*G06F 8/65* (2018.01)
*G06F 21/12* (2013.01)
*G06F 3/12* (2006.01)
*G06F 8/71* (2018.01)
*G06F 8/60* (2018.01)

(52) U.S. Cl.
CPC .............. *G06F 8/65* (2013.01); *G06F 21/121*
(2013.01); *G06F 3/1204* (2013.01); *G06F 8/60*
(2013.01); *G06F 8/71* (2013.01); *G06F 21/126*
(2013.01)

(58) Field of Classification Search
CPC ...... G06F 3/123; G06F 3/0486; G06F 3/1204;
G06F 21/121; G06F 21/126; G06F
21/105; G06F 21/57; G06F 21/12
See application file for complete search history.

(56) References Cited

U.S. PATENT DOCUMENTS

| | | | | |
|---|---|---|---|---|
| 7,930,273 B1* | 4/2011 | Clark | ........................ | G06F 8/71 707/638 |
| 8,051,158 B2* | 11/2011 | Kojima | ................. | G06F 21/105 709/223 |
| 8,375,381 B1* | 2/2013 | Clark | ........................ | G06F 8/71 717/170 |
| 8,448,161 B2* | 5/2013 | Goldman | .................. | G06F 8/65 717/170 |
| 8,848,496 B2* | 9/2014 | Senshu | ............ | G11B 20/00275 369/14 |
| 9,003,387 B2* | 4/2015 | Van Camp | ................. | G06F 8/65 717/170 |
| 9,558,326 B2* | 1/2017 | Sugiura | ................... | G06F 9/453 |
| 9,588,748 B2* | 3/2017 | Wabe | ................... | G06F 1/3265 |
| 9,672,023 B2* | 6/2017 | Matthew | ................... | G06F 8/60 |
| 10,223,042 B2* | 3/2019 | Fukasawa | ................. | G06F 8/61 |
| 10,387,086 B2* | 8/2019 | Nakatani | ............... | G06F 3/0486 |
| 10,417,397 B2* | 9/2019 | Ogura | ................... | G06F 21/105 |
| 10,521,192 B2* | 12/2019 | Nakatani | ............... | G06F 21/126 |
| 2001/0052121 A1* | 12/2001 | Masuda | .................... | G06F 8/60 717/170 |
| 2004/0045000 A1* | 3/2004 | Hara | ........................ | G06F 8/61 717/178 |
| 2005/0188381 A1* | 8/2005 | Mitekura | ................ | G06F 9/453 719/321 |
| 2006/0218528 A1* | 9/2006 | Lerner | ...................... | G06F 8/60 717/120 |
| 2007/0006222 A1* | 1/2007 | Maier | ...................... | G06F 8/61 717/174 |
| 2007/0104039 A1* | 5/2007 | Shin | ........................ | G06F 8/61 369/30.05 |
| 2007/0106984 A1* | 5/2007 | Birk Olsen | ............... | G06F 8/61 717/174 |
| 2007/0277171 A1* | 11/2007 | Oi | ............................ | G06F 8/61 717/174 |
| 2008/0163092 A1* | 7/2008 | Rao | .......................... | G06F 8/61 715/771 |
| 2008/0215722 A1* | 9/2008 | Hogaboom | ............. | H04L 43/00 709/224 |
| 2009/0037835 A1* | 2/2009 | Goldman | .................. | G06F 8/65 715/771 |
| 2014/0215450 A1* | 7/2014 | Salisbury | .................. | G06F 8/60 717/170 |
| 2014/0282480 A1* | 9/2014 | Matthew | ................... | G06F 8/60 717/172 |
| 2015/0089473 A1* | 3/2015 | Gocek | ....................... | G06F 8/61 717/120 |
| 2015/0193215 A1* | 7/2015 | Jianu | ..................... | H04L 63/123 717/177 |
| 2015/0294093 A1* | 10/2015 | Yabe | ....................... | G06F 21/12 726/26 |
| 2016/0070557 A1* | 3/2016 | Yamada | ................... | G06F 8/65 717/172 |
| 2017/0068531 A1* | 3/2017 | Ech-Chergui | ....... | H04L 41/0803 |
| 2017/0160995 A1* | 6/2017 | Fukasawa | ............. | G06F 3/1204 |

OTHER PUBLICATIONS

David Barrera et al., Secure Software Installation on Smartphones, 2011 IEEE, [Retrieved on Apr. 28, 2021]. Retrieved from the internet: <URL: https://ieeexplore.ieee.org/stamp/stamp.jsp?tp=&arnumber=5674007> 8 Pages (42-48) (Year: 2011).*

* cited by examiner

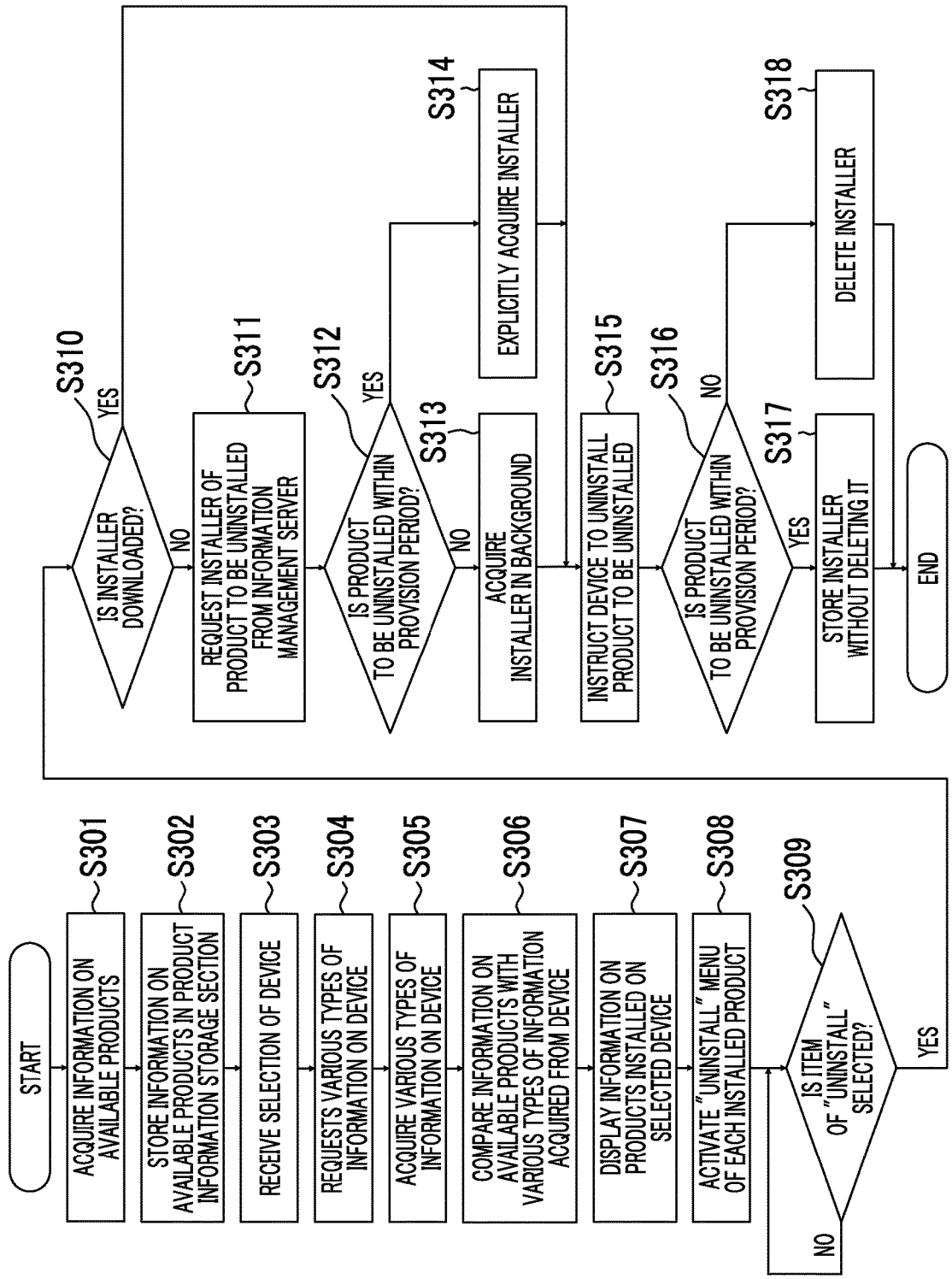

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-002295 filed Jan. 11, 2018.

BACKGROUND

(i) Technical Field

The present invention relates to an information processing apparatus and a non-transitory computer readable medium storing a program.

(ii) Related Art

As a software usage period control method, for example, JP2005-128593A discloses a technique in which for software of which software usage period is set and which is available only for a certain period from the installed date and time, information related to the usage period is registered with a computer when the software is installed, and in a case where the software is executed after the period has expired, a deletion program of the software is automatically executed.

SUMMARY

In the related art, a technique for managing software installed on a device is known. Here, in a case where new software is no longer provided, for example, in a case where software information is not displayed on a screen in order to prohibit new installation of software, in the case where this software has been installed on the device, it is difficult to instruct on the screen to perform a predetermined process such as uninstallation or update of the software.

Aspects of non-limiting embodiments of the present disclosure relate to an information processing apparatus and a non-transitory computer readable medium storing a program, which enable a predetermined process to be performed on software installed on a device even in a case where new software is no longer provided.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including a display unit that displays a first list which is a list of available software and a second list which is a list of software installed on a target device; and a receiving unit that receives an instruction operation of installing the software displayed in the first list on the target device and an instruction operation of performing a predetermined process on the installed software displayed in the second list, in which the display unit continues to display the software in the second list, in a case where the software included in the second list is no longer newly provided, and the display unit does not display the software in the first list or displays a fact that it is not allowed to install the software, in a case where the software included in the first list is no longer newly provided.

BRIEF DESCRIPTION OF THE DRAWINGS

Exemplary embodiment(s) of the present invention will be described in detail based on the following figures, wherein:

FIG. 7 is a flowchart illustrating an example of a process of enabling control for uninstallation of a product of which provision period has expired;

DETAILED DESCRIPTION

Hereinafter, exemplary embodiments of the present invention will be described in detail with reference to the accompanying drawings.

Entire Configuration of Information Processing System

Figure 1:
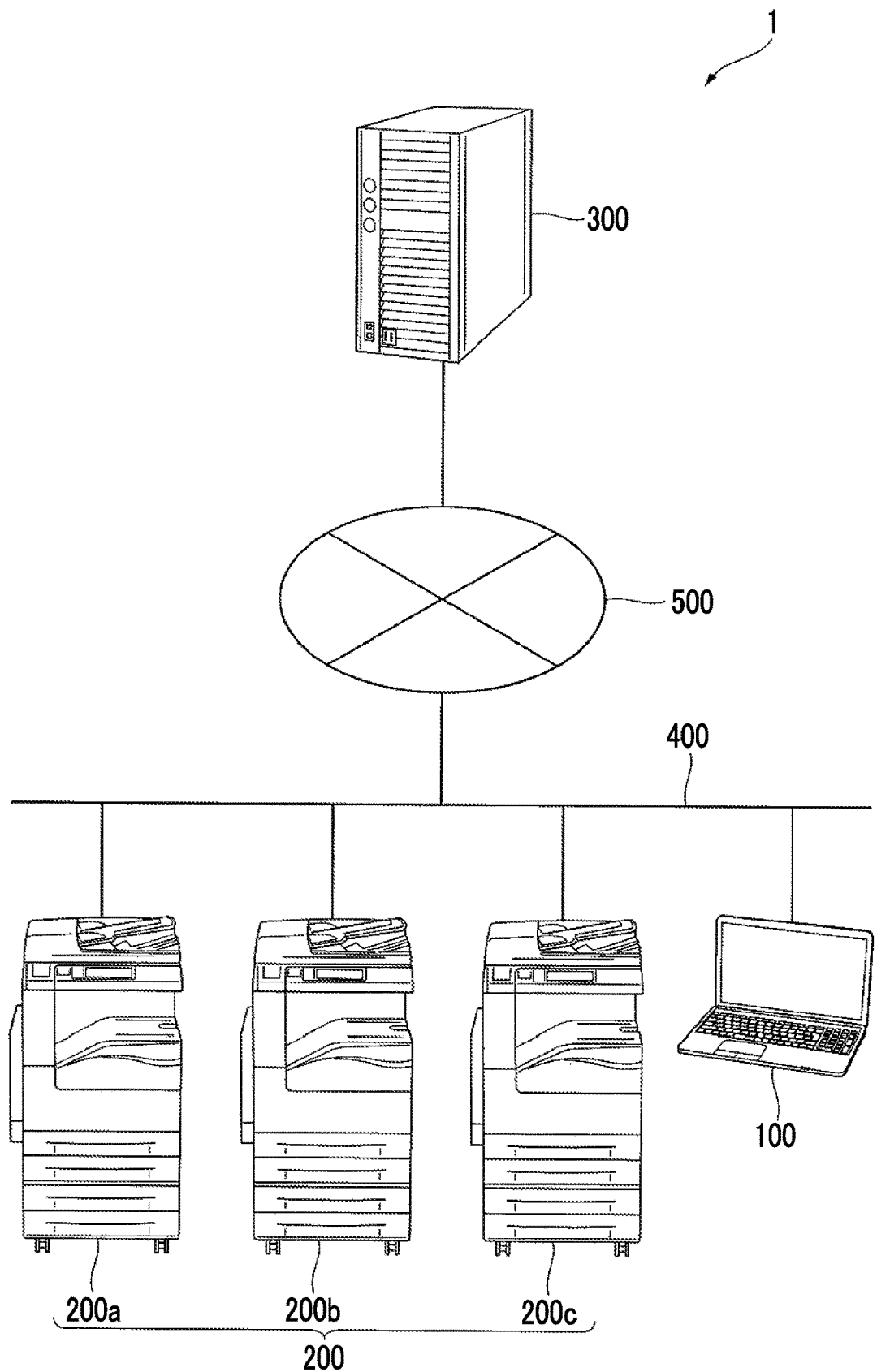
FIG. 1 is a diagram illustrating an entire configuration example of an information processing system according to a present exemplary embodiment.

First, the configuration of the entire configuration of an information processing system 1 according to the present exemplary embodiment will be described. FIG. 1 is a diagram illustrating an entire configuration example of the information processing system 1 according to the present exemplary embodiment. As illustrated, in the information processing system 1, a management terminal 100 and devices 200a, 200b, 200c are connected to a network 400. Further, an information management server 300 is connected to a network 500. Then, the management terminal 100 and the devices 200a, 200b, 200c are connected to the information management server 300 through the network 400 and the network 500.

The devices 200a, 200b, 200c are shown in FIG. 1, but in a case where it is unnecessary to distinguish them, they are referred to as a device 200. Further, only three devices 200 are shown in FIG. 1, but the number of devices 200 is not limited to three as illustrated. Further, one management terminal 100 and one information management server 300 are shown in FIG. 1, but the number of management terminals 100 and the number of information management servers 300 are not limited to one shown in FIG. 1.

The management terminal 100, which is an example of an information processing apparatus, is an apparatus that manages the device 200 and, for example, a personal computer (PC) or the like is exemplified. Application software for managing the device 200 (hereinafter, referred to as a management application) is installed on the management terminal 100, and the device 200 is managed by the management application.

More specifically, the management terminal 100 acquires from the device 200 various types of information on the device 200, such as the model of the device 200, a product installed on the device 200, the version of the product, and stores the acquired information. Further, the management terminal 100 acquires data on various products and information on various products provided by the information management server 300, from the information management server 300 and stores them.

Here, the product implements a predetermined function for the device 200, and specifically, it is configured with one or plural application software or the like. Therefore, the product in this exemplary embodiment may be regarded as, for example, application software, plural application software (software group), and the like. In the present exemplary embodiment, products are used as an example of software.

Then, the management terminal 100 displays the information acquired from the device 200 and the information acquired from the information management server 300 on the screen and presents it to the operator. Further, the management terminal 100 downloads the product provided by the information management server 300, or installs the downloaded product in the device 200, for example, by the operation of the operator on the screen. Further, the management terminal 100 upgrades or uninstalls the product installed on the device 200. As described above, by the management application, a process between the management terminal 100, the device 200, and the information management server 300 are performed, and the device 200 is managed.

The device 200 as an example of a target device is a device that processes data, and is, for example, an image forming apparatus having a function of forming an image on a recording medium by an electrophotographic method or an inkjet method. However, the device 200 is not limited to the image forming apparatus, and for example, a PC, a portable information terminal, or the like is also exemplified.

The information management server 300 is an apparatus which manages the data on various products and the information on various products to be provided to the device 200. As the information management server 300, for example, a personal computer (PC), a workstation, or the like is exemplified. The information management server 300 is an apparatus which transmits the data on products (application software) and the information on products to the management terminal 100, for example, in response to a request from the management terminal 100.

The network 400 is a communication unit used for information communication between the management terminal 100 and the device 200, and is, for example, a local area network (LAN).

The network 500 is a communication unit used for information communication between the management terminal 100, the device 200 and the information management server 300, and is, for example, the Internet or a public line.

Hardware Configuration of Management Terminal

Figure 2:
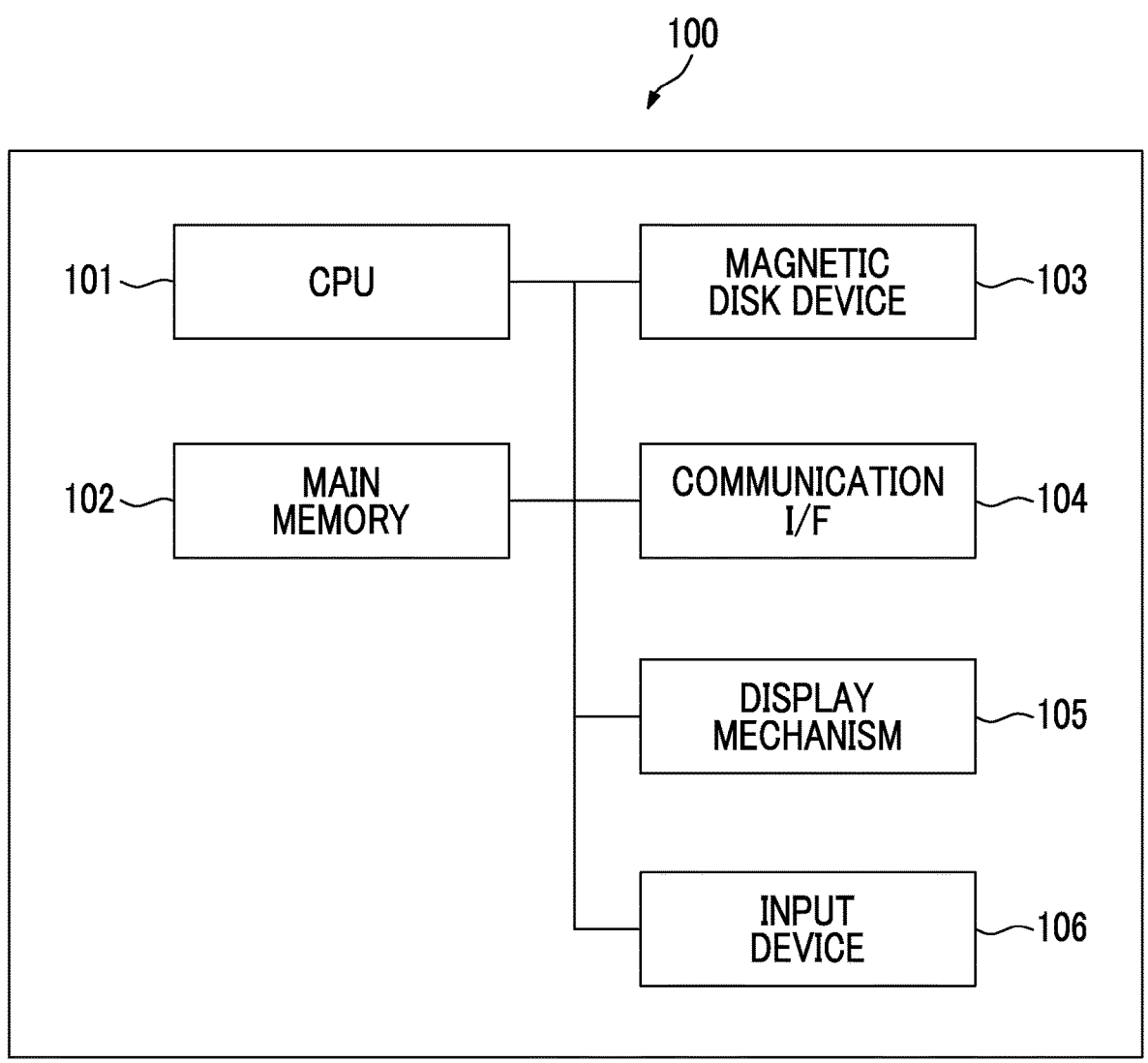
FIG. 2 is a diagram illustrating a hardware configuration example of a management terminal according to the present exemplary embodiment.

Next, the hardware configuration of the management terminal 100 according to the present exemplary embodiment will be described. FIG. 2 is a diagram illustrating a hardware configuration of the management terminal 100 according to the present exemplary embodiment.

As shown in FIG. 2, the management terminal 100 includes a central processing unit (CPU) 101 which is a calculation unit, and a main memory 102 and a magnetic disk device 103 which are storage units. The CPU 101 executes various programs such as an operating system (OS) and applications. The main memory 102 is a storage area for storing various programs and data used for execution thereof. The magnetic disk device 103 is a storage area for storing various programs, input data to various programs, output data from various programs, and the like. Then, the CPU 101 loads various programs stored in the magnetic disk device 103 and the like into the main memory 102 and executes them, thereby realizing each function of the management terminal 100.

Further, the management terminal 100 includes a communication interface (communication I/F) 104 for communicating with the outside, a display mechanism 105 including a video memory, a display, and the like, and an input device 106 such as a keyboard, a mouse, and a touch panel.

As for the information management server 300, for example, the same configuration as the hardware configuration example shown in FIG. 2 may be used.

Regarding Predetermined Period for Product

Next, a predetermined period for a product according to the present exemplary embodiment will be described.

In the present exemplary embodiment, a period during which products are newly provided from the information management server 300 (for example, a period during which products are newly sold in the information management server 300, hereinafter referred to as "provision period") is predetermined for each product. With respect to the product within the provision period, the display on the management terminal 100 is controlled so as to receive an operation of downloading the product from the information management server 300 or an operation of installing the product into the device 200.

On the other hand, in a case where the provision period of a product has expired, the product is no longer newly provided from the information management server 300, and enters a maintenance phase period (hereinafter referred to as a maintenance period). The maintenance period is also predetermined for each product. With respect to the product that has entered the maintenance period, the display on the management terminal 100 is controlled so as not to receive an operation of downloading the product from the information management server 300 or an operation of installing the product into the device 200.

However, in a case where the product installed on the device 200 enters the maintenance period, the display on the management terminal 100 is controlled so as to receive the operation of uninstalling or updating the product on the device 200. In the case where there is a successor product of the product installed on the device 200, even in a case where the installed product is within the maintenance period, the display on the management terminal 100 is controlled so as to receive an operation of updating the installed product to the successor product.

The maintenance period is a predetermined period after the provision period has expired. In the present exemplary embodiment, the maintenance period is, for example, a period in which new provision (for example, new sales) of products is stopped, but management (maintenance) by the information management server 300 is continued. In other words, the maintenance period is, for example, a period from when the new provision of products is stopped to when the management by the information management server 300 is completed. More specifically, the maintenance period is, for example, a period predetermined as a period during which new provision of the product is stopped but the normal operation of the products is guaranteed. During the maintenance period, for example, support by the provider of products, such as response to operator's trouble, is performed.

In addition, the product of which maintenance period has expired is a product not managed by the information management server 300, and the information on the product is deleted from the information management server 300. Then, for example, the operator's coping with trouble is not performed. In addition, products of which maintenance period has expired become products that are not managed even by the management application, and the operation of uninstalling or updating products on the screen of the management terminal 100 may also not be performed.

Further, the successor product described above is a product predetermined as a product succeeding the current product, and for example, it is a product created by inheriting the current product. More specifically, the successor product is, for example, a product that may realize at least a part of the functions realized by the current product. Further, the successor product is, for example, a product realizing the main function of the current product and realizing a new function not present in the current product. The successor product is not limited to the product within the provision period, but may be a product within the maintenance period, but in the following, it is described as the successor product being a product within the provision period. In the present exemplary embodiment, successor products are used as an example of another software.

As described above, in the present exemplary embodiment, the provision period and the maintenance period are determined for each product. With respect to products within the provision period, operations of new installation, uninstallation, and updating may be performed on the screen of the management terminal 100. With respect to products within the maintenance period, an operation of new installation is prohibited but operations of uninstallation and updating are possible, on the screen of the management terminal 100. Then, with respect to products after the maintenance period has expired, the products become out of management targets, and operations of new installation, uninstallation, and updating may not be performed on the screen of the management terminal 100.

Functional Configuration of Information Management Server

Figure 3:
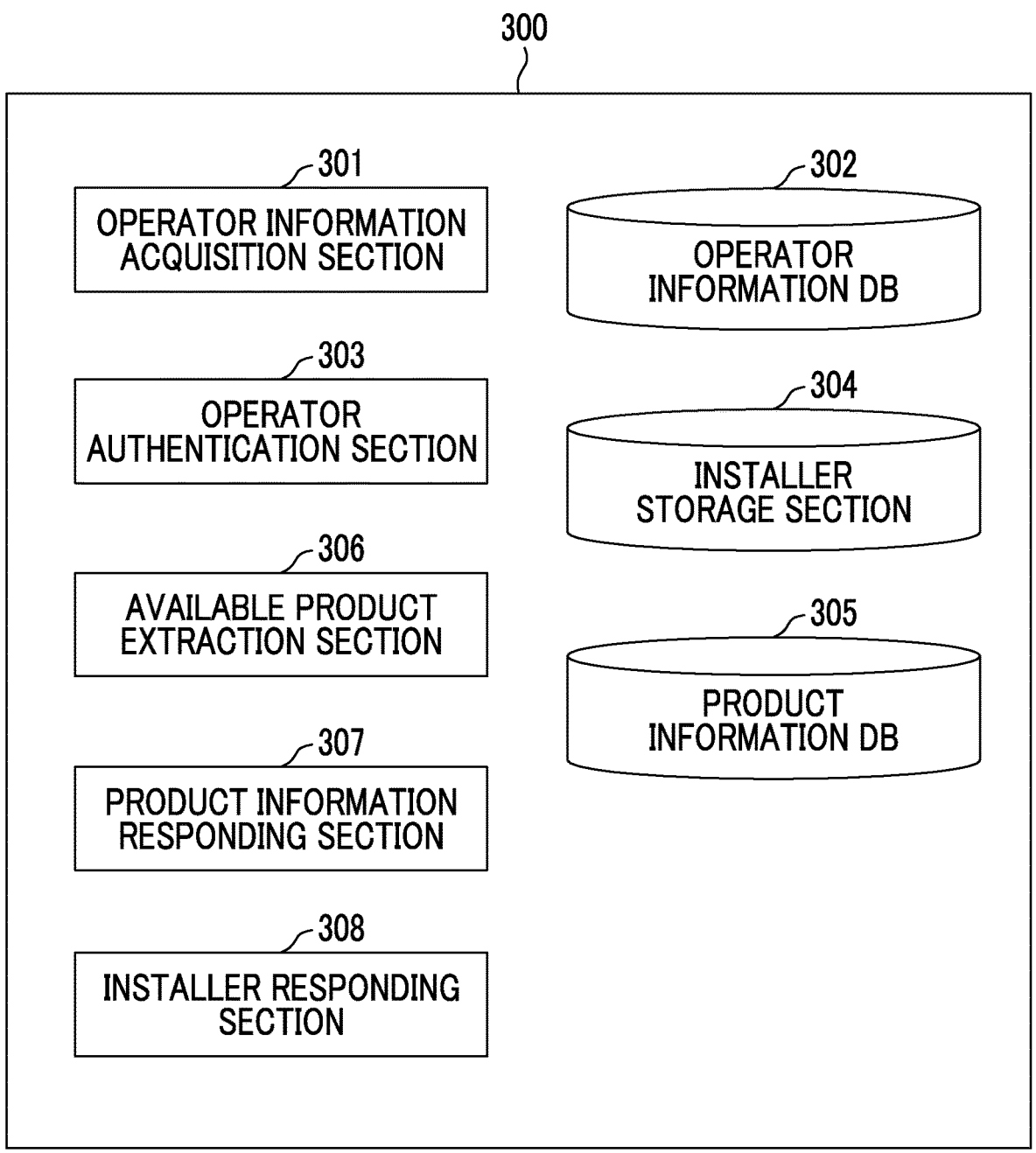
FIG. 3 is a block diagram illustrating a functional configuration example of an information management server according to the present exemplary embodiment.

Next, the functional configuration of the information management server 300 according to the present exemplary embodiment will be described. FIG. 3 is a block diagram illustrating a functional configuration example of the information management server 300 according to the present exemplary embodiment. The information management server 300 according to the present exemplary embodiment includes an operator information acquisition section 301, an operator information DB 302, an operator authentication section 303, an installer storage section 304, a product information DB 305, an available product extraction section 306, a product information responding section 307, and an installer responding section 308.

The operator information acquisition section 301 acquires information on the operator who operates the management terminal 100 from the management terminal 100. For example, in a case where the operator operates the management terminal 100 to log in to the management application, the information on the logged-in operator is transmitted from the management terminal 100 to the information management server 300. As the information on the operator to be acquired here, for example, information such as an operator ID and a password, which are input by the operator in a case where the operator logs in, is exemplified. The operator ID is an identifier uniquely assigned to the operator to identify the operator.

The operator information DB 302 is a database for storing operator information predetermined in advance as an operator of the management terminal 100. As the stored information on the operator, for example, information such as the name and age of the operator, the place of residence, and the presence or absence of registration of a credit card is exemplified. Here, the information on the age of the operator, the place of residence, and the presence or absence of registration of a credit card may be regarded as an example of information indicating the type of the operator. The information on the operator includes information used for authentication of the operator authentication section 303, for example, information such as an operator ID and a password.

The operator authentication section 303 performs user authentication, based on operator information acquired by the operator information acquisition section 301. Here, the operator authentication section 303 compares the operator information acquired by the operator information acquisition section 301 with the operator information stored in the operator information DB 302, and performs user authentication. More specifically, for example, in a case where the set of operator ID and password acquired by the operator information acquisition section 301 is stored in the operator information DB 302, the operator authentication section 303 makes the user authentication successful. On the other hand, in a case where the set of operator ID and password acquired by the operator information acquisition section 301 is stored in the operator information DB 302, the operator authentication section 303 makes the user authentication failure.

The installer storage section 304 stores an installer for products that may be provided by the information management server 300. In general, the installer is software used for newly installing the application software, and in the present exemplary embodiment, it is used for installing products. However, in the present exemplary embodiment, the installer is used not only for installing products but also for updating or uninstalling products.

To describe further, in the present exemplary embodiment, for example, a process of newly installing products on the device 200 is performed by activating the installer in the management terminal 100. Further, for example, in a case where the product is installed on the device 200, a process of updating the installed product to a new version is performed by activating the installer. Further, by activating the installer, a process of uninstalling the product installed on the device 200 is performed.

In addition, the installer includes information on the model of the device 200 corresponding to the installer (that is, the model of the device 200 capable of installing, updating, or uninstalling the product by the installer).

In addition, the installer stored in the installer storage section 304 is an installer of a product that may be provided by the information management server 300, in other words, an installer of a product within the provision period and an installer of a product within the maintenance period. That is, the installer storage section 304 does not store the installer of the product of which maintenance period has expired. In a case where the maintenance period of the product has expired, the installer of the product is deleted from the installer storage section 304.

The product information DB 305 is a database that stores information on products that may be provided by the information management server 300. In the product information DB 305, as the information on a product, for example, information such as the name of the product, the description of the product (description of the function realized by the product), the version of the product, the release date of the product, and the model of the device 200 corresponding to the product is exemplified. Further, the information on the product includes information indicating the state of provision of the product. The information indicating the state of provision of the product is information on the provision period and the maintenance period of the product. More specifically, for example, the information such as whether the product is within the provision period at present, whether the product is within the maintenance period, the expiration date of the provision period, the expiration date of the maintenance period, and the like. In addition, the information on the product includes information indicating the presence or absence of the successor product.

As in the installer storage section 304, the information stored in the product information DB 305 is information on products within the provision period, and information on products within the maintenance period, and information on products of which the maintenance period has expired is not stored. In a case where the maintenance period of the product has expired, the information on the product is deleted from the product information DB 305.

Based on the information on the operator acquired by the operator information acquisition section 301, the available product extraction section 306 extracts, from the information included in the product information DB 305, the products available for the operator (hereinafter, referred to as available products). Here, the available product extraction section 306 extracts available products in accordance with the type of the operator. For example, in a case where the operator resides in the country, the available product extraction section 306 excludes products not available in the country, and extracts products available in the country, among products included in the product information DB 305, as available products. Further, for example, in a case where the operator registers a credit card, the available product extraction section 306 extracts, as available products, not only free products but also paid products, among products included in the product information DB 305.

The product information responding section 307 acquires the information on the available products extracted by the available product extraction section 306 from the product information DB 305 and transmits the acquired information on the available products to the management terminal 100. The information on the available products to be transmitted includes information stored in the product information DB 305 for each available product. That is, for each available product, information such as the name of the product, the description of the product, the version of the product, the release date of the product, the model of the device 200 corresponding to the product, the state of provision of the product, the presence or absence of the successor product is transmitted to the management terminal 100.

In response to a request from the management terminal 100, the installer responding section 308 acquires the installer of the requested product from the installer storage section 304. Then, the acquired installer is transmitted to the management terminal 100.

Functional Configuration of Management Terminal

Figure 4:
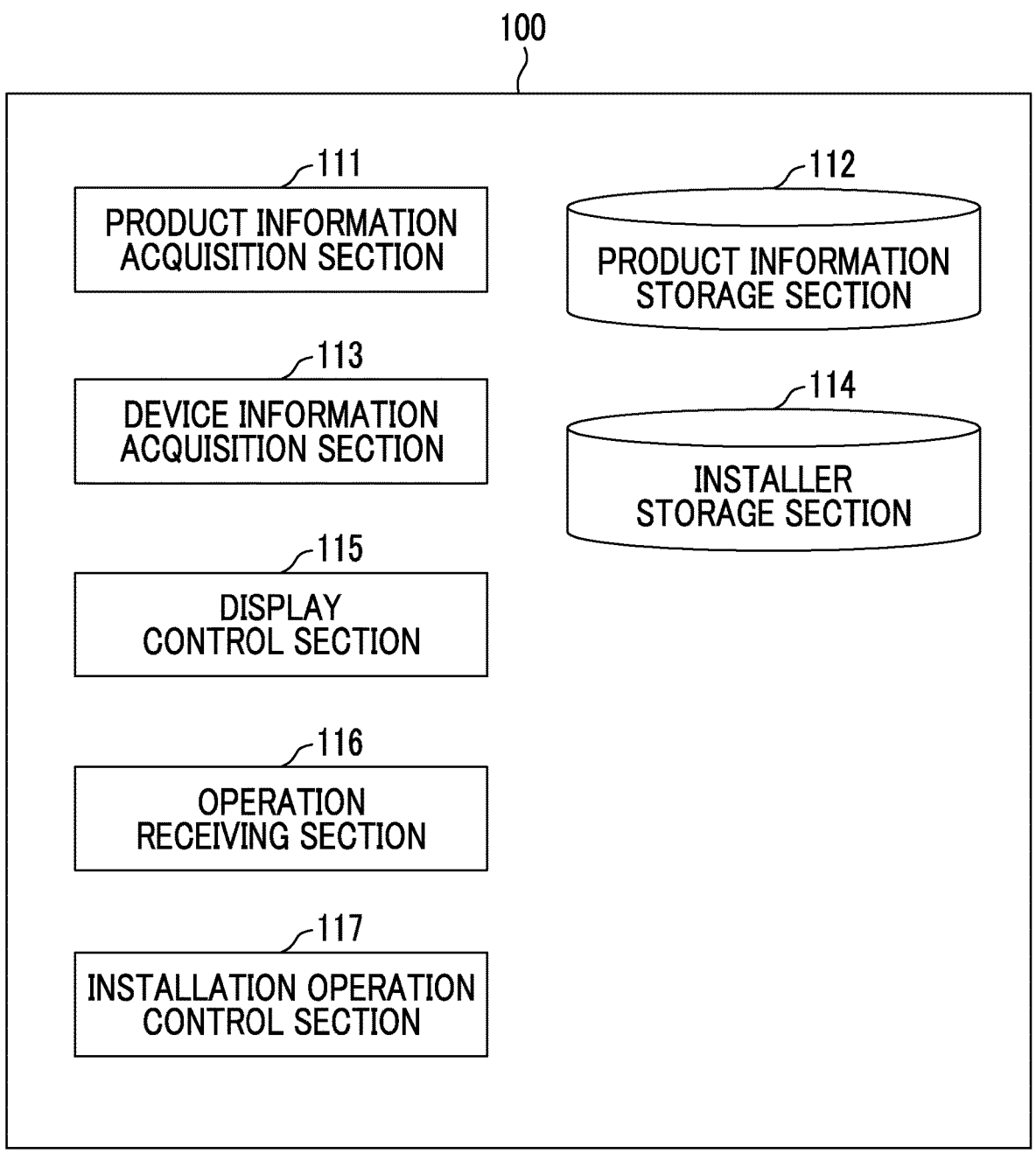
FIG. 4 is a block diagram illustrating a functional configuration example of the management terminal according to the present exemplary embodiment.

Next, the functional configuration of the management terminal 100 according to the present exemplary embodiment will be described. FIG. 4 is a block diagram illustrating a functional configuration example of the management terminal 100 according to the present exemplary embodiment. The management terminal 100 according to the present exemplary embodiment includes a product information acquisition section 111, a product information storage section 112, a device information acquisition section 113, an installer storage section 114, a display control section 115, an operation receiving section 116, and an installation operation control section 117.

The product information acquisition section 111 acquires information on available products from the product information responding section 307 of the information management server 300.

The product information storage section 112 stores the information on available products acquired by the product information acquisition section 111. In a case where the information on the already stored product is newly stored in the product information storage section 112, the information on the product is updated. For example, in a case where the product information storage section 112 stores the information on the product A and the product information acquisition section 111 newly acquires the information on the product A, the information on the product A stored in the product information storage section 112 is updated to newly acquired information. More specifically, for example, the version of the product A that may be provided by the information management server 300 is updated from the old version to the latest version.

Similarly to the product information DB 305 of the information management server 300, the information stored in the product information storage section 112 is information on products within the provision period, and information on products within the maintenance period, and information on products of which the maintenance period has expired is not stored. In a case where the maintenance period of the product has expired, the information on the product is deleted from the product information storage section 112.

The device information acquisition section 113 acquires various types of information on the device 200, from the device 200. For example, in a case where the operator selects one of the devices 200, the device information acquisition section 113 requests the selected device 200 to transmit various types of information. Then, various types of information on the device 200 are acquired. As the information on the device 200, for example, hardware information such as the model of the device 200, information on products installed on the device 200, and the like are exemplified.

The installer storage section 114 stores the installer of the product acquired from the information management server 300.

The display control section 115 as an example of the display unit displays the information acquired from the information management server 300 and the device 200 on a display or the like of the display mechanism 105 and presents it to the operator.

More specifically, the display control section 115 displays a list of available products on the screen, based on the information on the available products acquired by the product information acquisition section 111. Here, the display control section 115 displays on the screen information on products of which the provision period has not expired (that is, products within the provision period) among the available products, but hides information on the products of which the provision period has expired (that is, products within the maintenance period) without displaying it on the screen.

Then, the display control section 115 displays in the list of available products, a display for receiving download of the installer of the available product to the management terminal 100, and a display for receiving installation of the available product in the device 200. In the present exemplary embodiment, a list of available products is used as an example of the first list.

The display control section 115 displays a list of products installed on the device 200, based on the information acquired by the device information acquisition section 113 and the information on available products acquired from the information management server 300. Here, the display control section 115 displays on the screen, not only the information on the product within the provision period but also the information on the product within the maintenance period of which the provision period has expired, as the product installed on the device 200.

Then, the display control section 115 displays on the list of products installed on the device 200, a display for receiving the uninstallation of the product in the device 200, and a display for receiving the updating of the product in the device 200. In the present exemplary embodiment, a list of products installed on the device 200 is used as an example of the second list.

To describe further, the display control section 115 compares the installed version with the latest version acquired from the information management server 300, for each product installed on the device 200, and determines whether or not the version installed on the device 200 is the latest version. Then, the display control section 115 performs a display for receiving the updating of a product of which the version installed on the device 200 is not the latest version. In addition, the display control section 115 determines whether or not there is a successor product, based on the information acquired from the information management server 300, for each product installed on the device 200. Then, the display control section 115 performs a display for receiving the updating of the product having the successor product.

That is, in at least one of the case where the installed version is not the latest version or the case where there is the successor product, for the product installed on the device 200, the display control section 115 determines that the product may be updated and makes a display for receiving updating. In the present exemplary embodiment, an uninstallation process or an updating process is used as an example of the predetermined process.

The operation receiving section 116 as an example of a receiving unit receives an operator's operation by, for example, a touch panel, a mouse, or the like.

More specifically, for example, the operation receiving section 116 receives an operation for the operator to log in to the management application. In a case of receiving the login operation, the operation receiving section 116 transmits the information on the logged-in operator to the information management server 300.

Further, for example, the operation receiving section 116 receives on the list of available products, an operation of downloading the installer of the available product to the management terminal 100 and an operation of installing the available product in the device 200. Further, the operation receiving section 116 receives on the list of products installed on the device 200, an operation of uninstalling the product installed on the device 200 and an operation of updating the product installed on the device 200.

In a case where the operation of downloading the installer of the product is performed on the list of available products, the installation operation control section 117 requests the installer of the product from the information management server 300 and downloads the installer of the product. Further, in a case where an operation of installing products is performed, in the list of available products, the installation operation control section 117 activates the downloaded installer, transmits data necessary for installation to the device 200, and instructs the device 200 to install the products.

Ina case where the operation of uninstalling the product is performed, in the list of products installed on the device 200, the installation operation control section 117 activates the installer of the product and instructs the device 200 to uninstall the product. Here, in a case where the installer of the product to be uninstalled is not stored in the installer storage section 114, the installation operation control section 117 acquires the installer from the information management server 300.

In addition, as the case where the installer is not stored, for example, a case where there is plural management terminals 100, the installer is stored in one management terminal 100, but the installer is not stored in the management terminal 100 being operated by the operator is exemplified.

Further, in a case where an operation of updating the product is performed, on the list of products installed on the device 200, the installation operation control section 117 determines whether or not there is a successor product to the product. In a case where there is the successor product, the installation operation control section 117 acquires the installer of the successor product from the information management server 300. On the other hand, in a case where there is no successor product, the installation operation control section 117 acquires an installer corresponding to the new version of the product to be updated, from the information management server 300. Then, in a case of acquiring the installer of the successor product or the installer corresponding to the new version, the installation operation control section 117 activates the acquired installer, transmits the data necessary for the update to the device 200, and instructs the device 200 to update the product. In the present exemplary embodiment, the installer of the successor product is used as an example of the first installer. The installer corresponding to the new version is used as an example of the second installer.

To describe further, in a case where there is a successor product of the products to be updated, the device 200 performs a process of updating the product to be updated to the successor product. The process of updating to a successor product is a process of replacing a product to be updated with the successor product, in other words, for example, a process of uninstalling the product to be updated and newly installing the successor product.

In a case where there is no successor product of the product to be updated, the device 200 performs a process of updating the product to be updated, in other words, a process of updating the product to be updated to a newer version than the current version.

Further, in uninstallation of the product, in a case where the product is within the provision period, the installation operation control section 117 stores the installer in the installer storage section 114 without deleting the installer, after the uninstallation is completed. On the other hand, in a case where the provision period of the product has expired, the installer is deleted after uninstallation is completed.

Further, in updating of the product, in a case of updating the product to the successor product, the installation operation control section 117 stores the installer of the successor product in the installer storage section 114 without deleting the installer, after the updating is completed.

Further, in updating the product to a new version, in a case where the product is within the provision period, the installation operation control section 117 stores the installer in the installer storage section 114 without deleting the installer, after the updating is completed. On the other hand, in a case where the provision period of the product has expired, the installer is deleted after the update is completed.

In this way, the installer is deleted with respect to the product of which provision period has expired, in order to prevent the operator from newly installing the product using the installer.

In acquisition of the installer of the product to be uninstalled, the installer of the product to be updated, or the installer of the successor product from the information management server 300, in a case where the provision period of the product of the installer to be acquired is ended, the installation operation control section 117 acquires the installer from the background. In other words, in a case where the installation operation control section 117 acquires the installer, the fact that the installer is acquired is not displayed on the screen. On the other hand, in a case where the product of the installer acquired by the installation operation control section 117 is within the provision period, the installer is explicitly acquired. In other words, in a case where the installation operation control section 117 acquires the installer, the fact that the installer is acquired is displayed on the screen. For example, in a case where the installation operation control section 117 acquires the installer of the successor product, the successor product is within the provision period, so the fact that the installer is acquired is displayed on the screen. On the other hand, for example, in a case where the installation operation control section 117 acquires the installer of the product within the maintenance period, the fact that the installer is acquired is not displayed on the screen.

In this way, with respect to products of which the provision period has expired, the installer is acquired in the background such that the operator is not explicitly notified that the installer of the product has been acquired. On the other hand, with respect to products within the provision period, the operator is explicitly notified that the installer has been acquired. In the present exemplary embodiment, the installation operation control section 117 is used as an example of the uninstalling unit and the processing unit.

Each functional unit of the management terminal 100 is realized by cooperation of software and hardware resources. Specifically, in a case where the management terminal 100 is realized by the hardware configuration shown in FIG. 2, the respective functional sections such as the product information acquisition section 111, the device information acquisition section 113, the display control section 115, the operation receiving section 116, and the installation operation control section 117 are realized, for example, by the OS program and the application program stored in the magnetic disk device 103, or the like being read into the main memory 102 and executed by the CPU 101. Further, the product information storage section 112 and the installer storage section 114 are realized by the storage unit such as the magnetic disk device 103, for example. In the present exemplary embodiment, the respective functional sections such as the product information acquisition section 111, the device information acquisition section 113, the display control section 115, the operation receiving section 116, and the installation operation control section 117 are realized by a management application.

Process of Transmitting Information on Available Products

Figure 5:
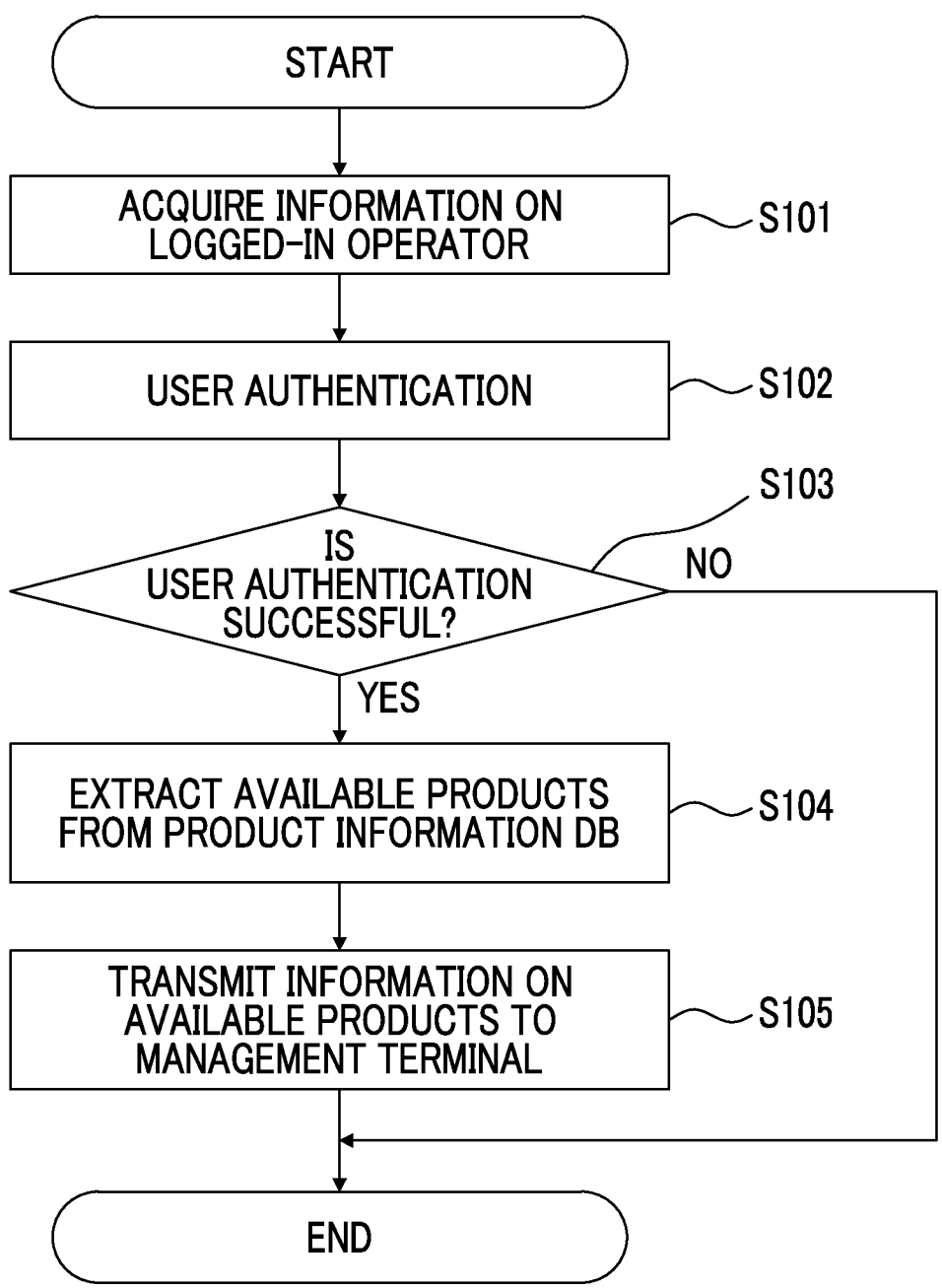
FIG. 5 is a flowchart illustrating an example of a process in which the information management server transmits information on available products to the management terminal.

Next, a process in which the information management server 300 transmits information on available products to the management terminal 100 will be described. FIG. 5 is a flowchart illustrating an example of a process in which the information management server 300 transmits information on available products to the management terminal 100.

First, in a case where the operator performs an operation of logging in to the management application on the screen of the management terminal 100, the operator information acquisition section 301 acquires information on the logged-in operator from the management terminal 100 (step S101). Next, the operator authentication section 303 performs user authentication, based on operator information acquired by the operator information acquisition section 301 (step S102). Then, the operator authentication section 303 determines whether or not the user authentication is successful (step S103).

In a case where a negative determination (NO) is made in step S103, the information on the available product is not transmitted and the process flow ends. On the other hand, in a case where an affirmative determination (YES) is made in step S103, the available product extraction section 306 extracts available products from the product information DB 305, based on the information on the operator acquired by the operator information acquisition section 301 and the information stored in the operator information DB 302 (step S104). Next, the product information responding section 307 transmits the information on the available products extracted by the available product extraction section 306 to the management terminal 100 (step S105). Then, the process flow ends.

Invalidating Control for New Installation

Figure 6:
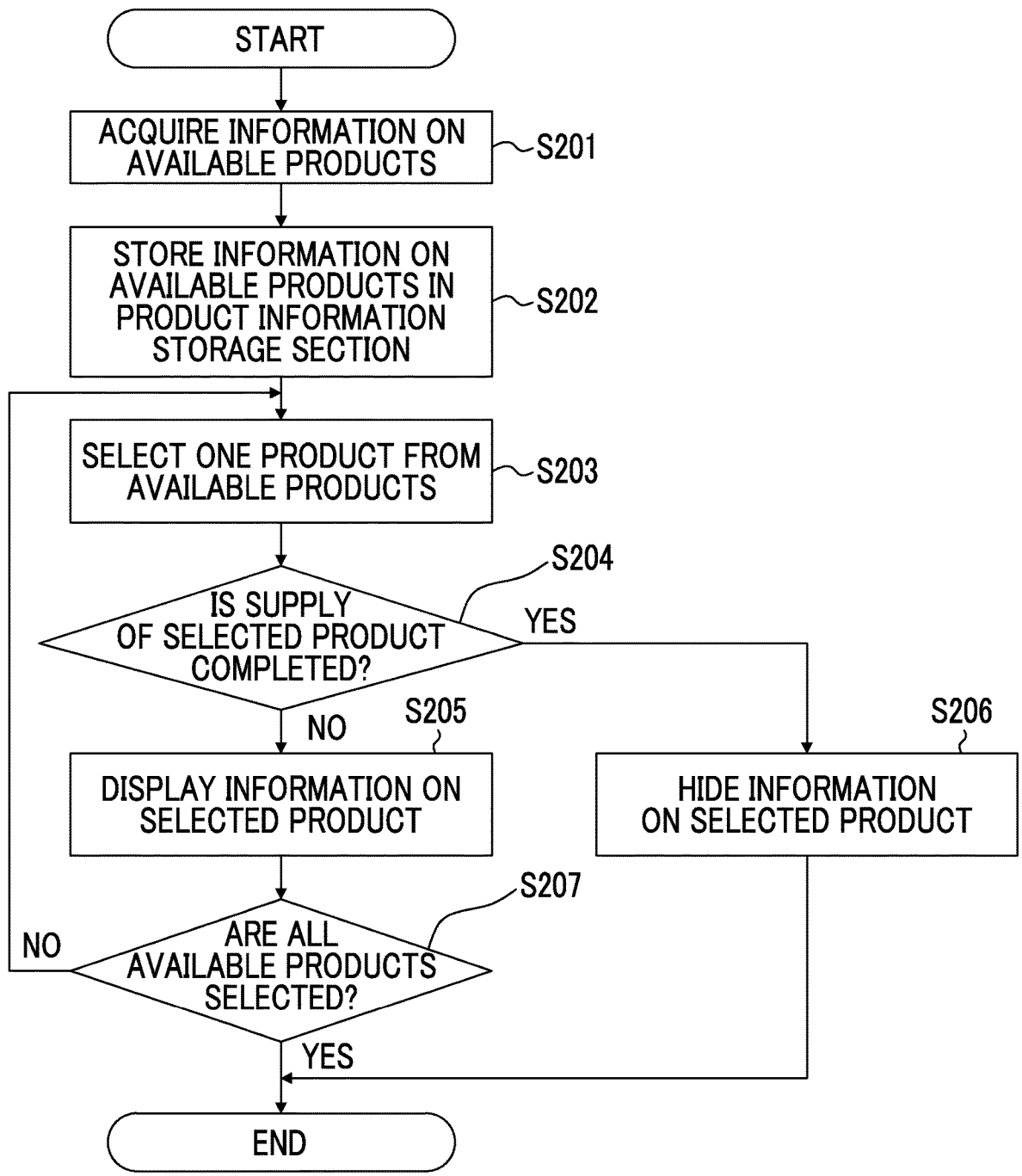
FIG. 6 is a flowchart illustrating an example of a process of invalidating control for a new installation of a product of which provision period has expired.

Next, a description will be given of control (invalidating control for new installation) for making it impossible to newly install a product of which provision period has expired. FIG. 6 is a flowchart illustrating an example of a process of invalidating control for a new installation for a product of which provision period has expired. The process shown in FIG. 6 is performed after the information management server 300 transmits the information on the available products to the management terminal 100 in step S105 of FIG. 5.

First, the product information acquisition section 111 of the management terminal 100 acquires information on available products from the product information responding section 307 of the information management server 300 (step S201). Next, the product information acquisition section 111 stores the acquired information on the available products in the product information storage section 112 and updates the information in the product information storage section 112

(step S202). Next, the display control section 115 selects one product from the available products (step S203). Next, the display control section 115 determines whether or not the selected product is no longer provided (step S204).

Here, the determination in step S204 is performed based on the state of provision of each available product acquired from the information management server 300. That is, depending on the state of provision of the product, in a case where the product is within the provision period, a negative (NO) determination is made in step S204. On the other hand, in a case where the product is within the maintenance period, an affirmative determination (YES) is made in step S204.

In a case where a negative determination (NO) is made in step S204, the display control section 115 displays the information on the selected product on the screen (step S205). On the other hand, in a case where an affirmative determination (YES) is made in step S204, the display control section 115 hides the information on the selected product without displaying it on the screen (step S206).

After step S205 or step S206, the display control section 115 determines whether all available products acquired from the information management server 300 have been selected (step S207). In a case where an affirmative determination (YES) is made in step S207, the process flow ends. On the other hand, in a case where a negative determination (NO) is made in step S207, the process proceeds to step S203, and products that have not yet been selected from available products are selected subsequently.

In this manner, the display control section 115 displays products within the provision period among available products acquired from the information management server 300, while hiding the products within the maintenance period, of which the provision period has expired. In other words, the display control section 115 displays the product within the provision period in the list of available products, but in a case where the provision period has expired and a new product is no longer provided, the display control section 115 hides the product. Therefore, on the screen of the management terminal 100, an operator's operation of newly installing the product of which provision period has expired is not performed.

Enabling Control for Uninstallation

Next, a control (enabling control for uninstallation) for enabling uninstallation of a product of which provision period has expired will be described. FIG. 7 is a flowchart illustrating an example of a process of enabling control for uninstallation of a product of which provision period has expired. Similar to the processing shown in FIG. 6, the processing shown in FIG. 7 is also performed after the processing of step S105 in FIG. 5. That is, after step S105 in FIG. 5, the process shown in FIG. 7 is performed in parallel with the process shown in FIG. 6.

Since the process of step S301 and step S302 is the same as the process of step S201 and step S202, the description thereof will be omitted here. In actual process, after the process of step S201 and step S202, the process of step S303 and the subsequent steps are performed.

In step S303, the operation receiving section 116 receives the selection of the device 200 (step S303). Here, in a case where the management terminal 100 manages the plural devices 200, any one of the devices 200 is selected from the plural devices 200 by the operation of the operator. Next, the device information acquisition section 113 requests various types of information on the device 200 from the selected device 200 (step S304). Then, the device information acquisition section 113 acquires various types of information on the device 200 from the selected device 200 (step S305).

Next, the display control section 115 compares the information on the available products acquired from the information management server 300 with the various types of information acquired from the device 200 (step S306). Next, the display control section 115 displays on the screen, the information on the product installed on the selected device 200 (step S307). In other words, the information acquired by the device information acquisition section 113 may include information on the product of which the maintenance period has expired, or may not information on an application that is not a product managed by the information management server 300. Therefore, by comparing in step S306, the available products installed on the device 200 are extracted and displayed in a list.

Next, the display control section 115 activates the "uninstall" menu of each product in the list of installed products (step S308). More specifically, for example, the display control section 115 makes the item of "uninstall" on the screen so as to be selectable, for each of the installed products. Next, the operation receiving section 116 determines whether or not the item of "uninstall" of any of the products is selected (step S309). In a case where a negative determination (NO) is made in step S309, the determination in step S309 is made subsequently.

On the other hand, in a case where an affirmative determination (YES) is made in step S309, the installation operation control section 117 determines whether or not the installer has been downloaded for the product for which the item of "uninstall" has been selected (hereinafter referred to as the product to be uninstalled) (step S310). In a case where an affirmative determination (YES) is made in step S310, the process proceeds to step S315 to be described later.

On the other hand, in a case where a negative determination (NO) is made in step S310, the installation operation control section 117 requests an installer of the product to be uninstalled from the information management server 300 (step S311). Here, the installation operation control section 117 determines whether or not the product to be uninstalled is a product within the provision period (step S312). In a case where a negative determination (NO) is made in step S312, the installation operation control section 117 acquires the installer of the product to be uninstalled on the background (step S313). On the other hand, in a case where an affirmative determination (YES) is made in step S312, the installation operation control section 117 explicitly acquires the installer of the product to be uninstalled (step S314).

After step S313, after step S314, or in a case where an affirmative determination (YES) is made in the step S310, the installation operation control section 117 activates the installer of the product to be uninstalled and instructs the device 200 to uninstall the product to be uninstalled (step S315). Then, in a case of uninstalling the product to be uninstalled from the device 200, the installation operation control section 117 determines whether or not the product to be uninstalled is a product within the provision period as in step S310 (step S316).

In a case where an affirmative determination (YES) is made in step S316, the installation operation control section 117 stores the installer of the product to be uninstalled on the installer storage section 114 without deleting it (step S317). Then, the process flow ends. On the other hand, in a case where a negative determination (NO) is made in step S316, the installation operation control section 117 deletes the installer of the product to be uninstalled (step S318). Then, the process flow ends.

In this way, the display control section 115 displays on the screen not only the information on the product within the provision period, but also the information on the product within the maintenance period of which the provision period has expired, in the list of products installed on the device 200. In other words, the display control section 115 continues to display the product, even in a case where the provision period of the product has expired and the new product is not provided in the list of products installed on the device 200. In a case where the operator selects to uninstall the product within the maintenance period, uninstallation of the selected product is performed.

In the example described above, in step S308, the display control section 115 has activated the "uninstall" menu of all products in the list of installed products, but the present invention is not limited to such a configuration. For example, the display control section 115 may not activate the "uninstall" menu with respect to products for which uninstallation is prohibited. As examples of products for which uninstallation is prohibited, products preliminarily set so as not to be uninstalled by an operator's operation or products which affect the operation of other products in a case of being uninstalled are exemplified.

Enabling Control for Update

Figure 8A:
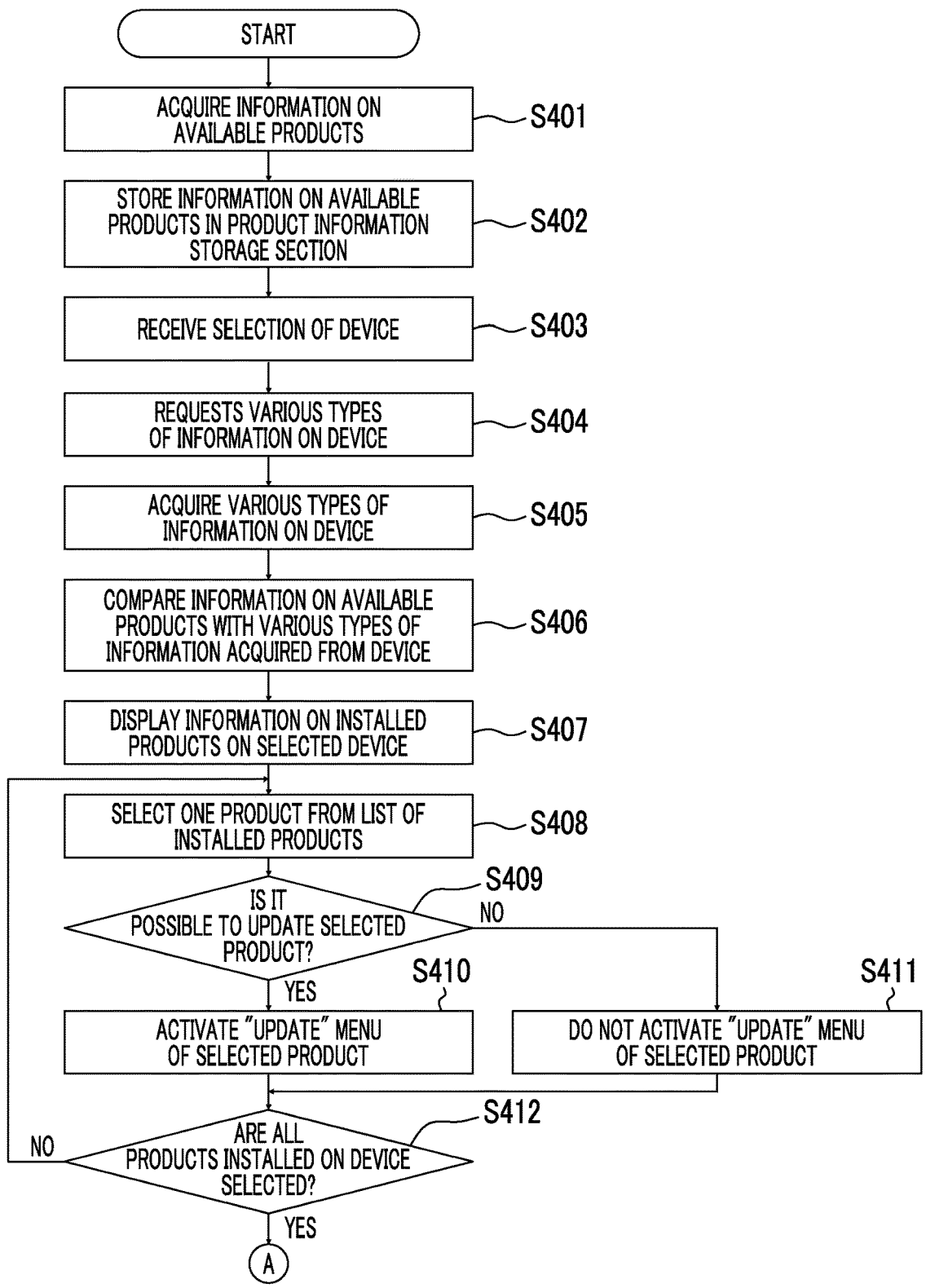
FIG. 8A is a flowchart illustrating an example of a process of enabling control for update of a product of which provision period has expired.
Figure 8B:
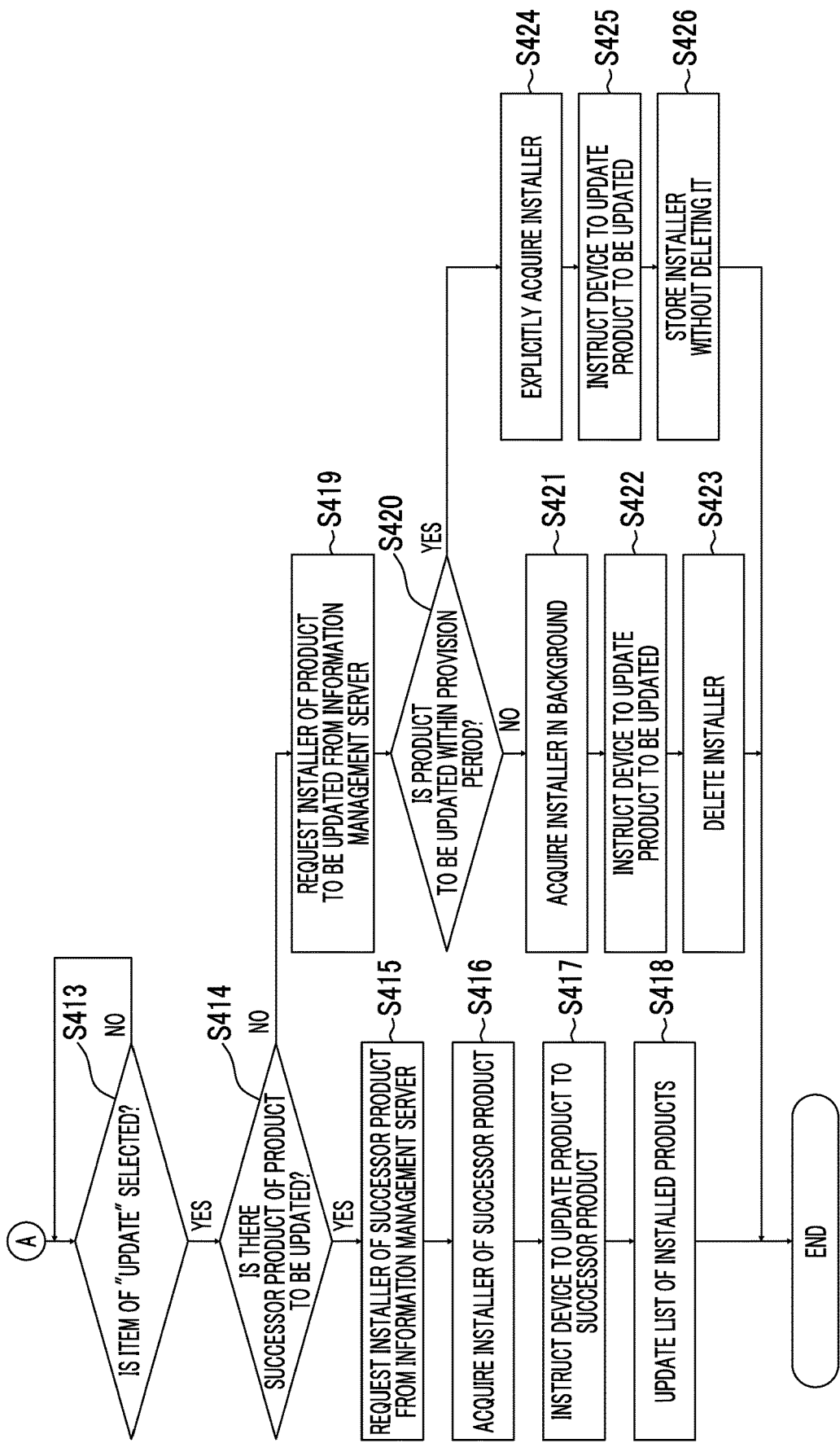
FIG. 8B is a flowchart illustrating an example of a process of enabling control for update of a product of which provision period has expired.

Next, a control (enabling control for update) for enabling update a product of which provision period has expired will be described. FIG. 8A and FIG. 8B are flowcharts illustrating an example of a process of enabling control for update of a product of which provision period has expired. Similar to the processes shown in FIGS. 6 and 7, the processes shown in FIGS. 8A and 8B are also performed after the process of step S105 in FIG. 5. That is, after step S105 in FIG. 5, the processes shown in FIGS. 8A and 8B are performed in parallel with the processes shown in FIGS. 6 and 7.

Since the processes of step S401 to step S407 are the same as the processes of step S301 to step S307 in FIG. 7, the description thereof will be omitted here. In actual process, after the processes of step S301 to step S307, the process of step S408 and the subsequent processes are performed.

The display control section 115 selects one product from the list of products installed on the device 200 (step S408). Next, the display control section 115 determines whether or not the selected product may be updated (step S409).

In step S409, the display control section 115 compares the version installed on the device 200 with the latest version acquired from the information management server 300, with respect to the selected product. In a case where the installed version is older than the latest version, an affirmative determination (YES) is made in step S409. Further, the display control section 115 determines whether or not there is a successor product for the selected product. In a case where there is a successor product for the selected product, an affirmative determination (YES) is made in step S409. On the other hand, in a case where the version installed on the device 200 is the same as the latest version and there is no successor product for the selected product, a negative determination (NO) is made in step S409.

In a case where an affirmative determination (YES) is made in step S409, the display control section 115 activates the "update" menu of the selected product (step S410). More specifically, for example, the display control section 115 makes the item of "update" on the screen so as to be selectable for the selected product. On the other hand, in a case where a negative determination (NO) is made in step S409, the display control section 115 does not activate the "update" menu of the selected product but leaves it inactivated (step S411). The state in which the "update" menu is inactivated means, for example, the case where the item of "update" is hidden or the case where the item of "update" is grayed out (display indicating a state deviated from the operation subject of the operator).

After step S410 or step S411, the display control section 115 determines whether or not all products installed on the device 200 have been selected (step S412). In a case where a negative determination (NO) is made in step S412, the process proceeds to step S408, and products that have not yet been selected from installed products are selected subsequently. On the other hand, in a case where an affirmative determination (YES) is made in step S412, the operation receiving section 116 determines whether or not the item of "update" of any product is selected (step S413). In a case where a negative determination (NO) is made in step S413, the determination in step S413 is made subsequently.

On the other hand, in a case where an affirmative determination (YES) is made in step S413, the installation operation control section 117 determines whether or not there is the successor product for the product for which the item of "update" is selected (hereinafter referred to as the product to be updated) (step S414).

In a case where an affirmative determination (YES) is made in step S414, the installation operation control section 117 requests the installer of the successor product from the information management server 300 (step S415). Then, the installation operation control section 117 acquires the installer of the successor product from the information management server 300 (step S416). Here, the installation operation control section 117 explicitly acquires the installer.

Next, the installation operation control section 117 activates the installer of the successor product and instructs the device 200 to update the product to be updated to the successor product (step S417). In a case where the device 200 updates the successor product, the display control section 115 updates the list of products installed on the device 200 (step S418). Here, the display control section 115 deletes the information on the product to be updated from the list of products installed on the device 200, and newly displays the information on the successor product. Then, the process flow ends.

On the other hand, in a case where a negative determination (NO) is made in step S414, the installation operation control section 117 requests an installer of the product to be updated from the information management server 300 (step S419). Here, the installation operation control section 117 determines whether or not the product to be updated is a product within the provision period (step S420).

In a case where a negative determination (NO) is made in step S420, the installation operation control section 117 acquires the installer of the product to be updated in the background (step S421). Next, the installation operation control section 117 activates the acquired installer and instructs the device 200 to update the product to be updated to a new version (step S422). In a case where the product to be updated is updated in the device 200, the installation operation control section 117 deletes the installer of the product to be updated (step S423). Then, the process flow ends.

On the other hand, in a case where an affirmative determination (YES) is made in step S420, the installation operation control section 117 explicitly acquires the installer of the product to be updated (step S424). Next, the installation operation control section 117 activates the acquired installer and instructs the device 200 to update the product to be updated to a new version (step S425). In a case where the product to be updated is updated in the device 200, the installation operation control section 117 stores the installer of the product to be updated in the installer storage section 114, without deleting it (step S426). Then, the process flow ends.

In this manner, the display control section 115 activates the "update" menu for products that may be updated, among the products installed on the device 200. By the operator selecting update of the product within the maintenance period, in a case where there is successor product of the product, a process to update to the successor product is performed, and in a case where there is no successor product of the product, a process of updating the product to a new version is performed.

In the example described above, the installation operation control section 117 explicitly acquires the installer of the successor product in step S416, but this corresponds to the case where the successor product is within the provision period. In the case where the successor product is within the provision period, in step S416, the installation operation control section 117 acquires the installer of the successor product in the background similarly to step S421. In the case where the successor product is not a product within the provision period and the update to the successor product is performed, the installation operation control section 117 deletes the installer of the successor product similarly to step S423.

Description of Display Screen of Management Terminal

Figure 9:
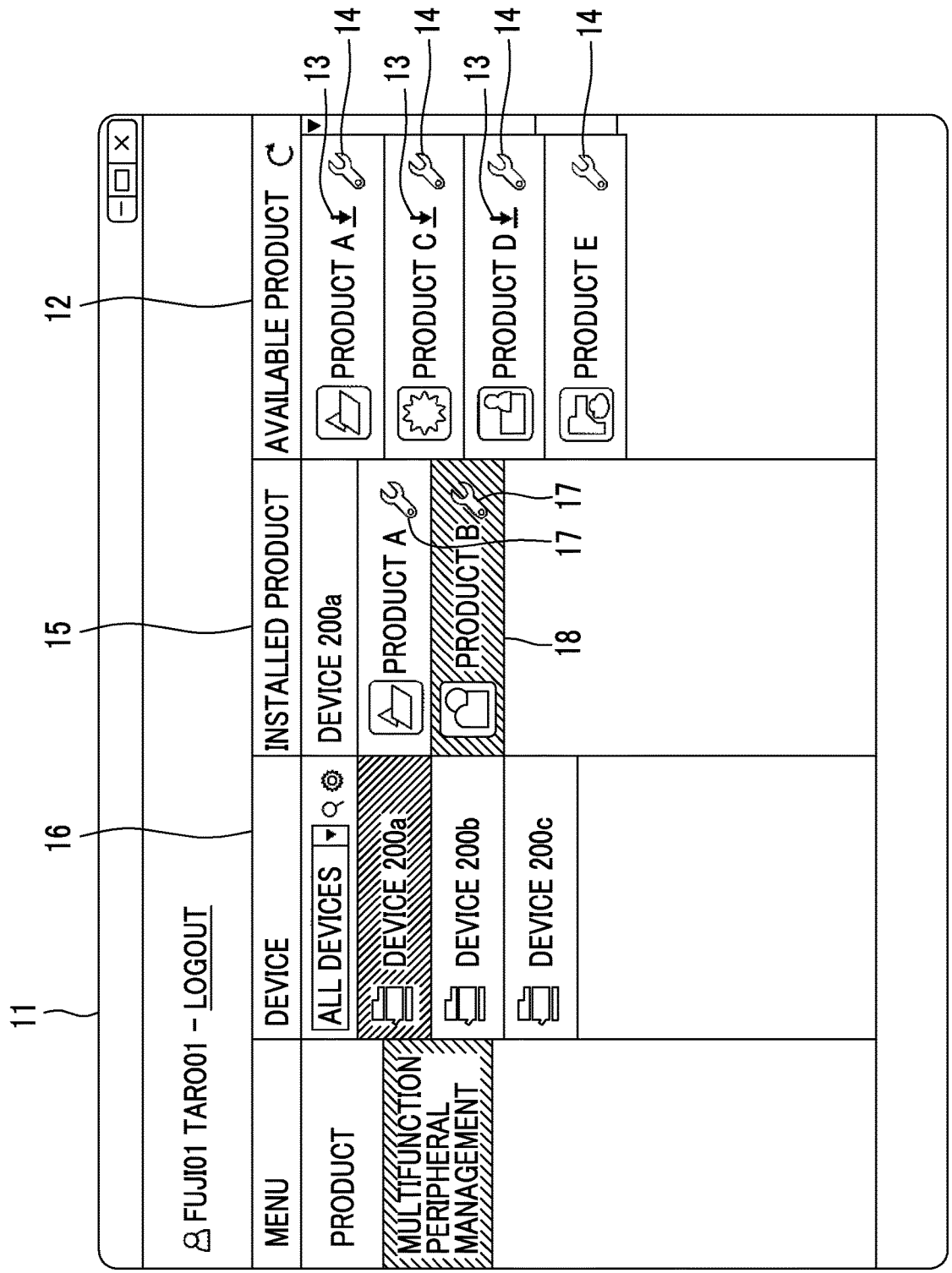
FIG. 9 is a diagram illustrating an example of a screen displayed on the management terminal.
Figure 10:
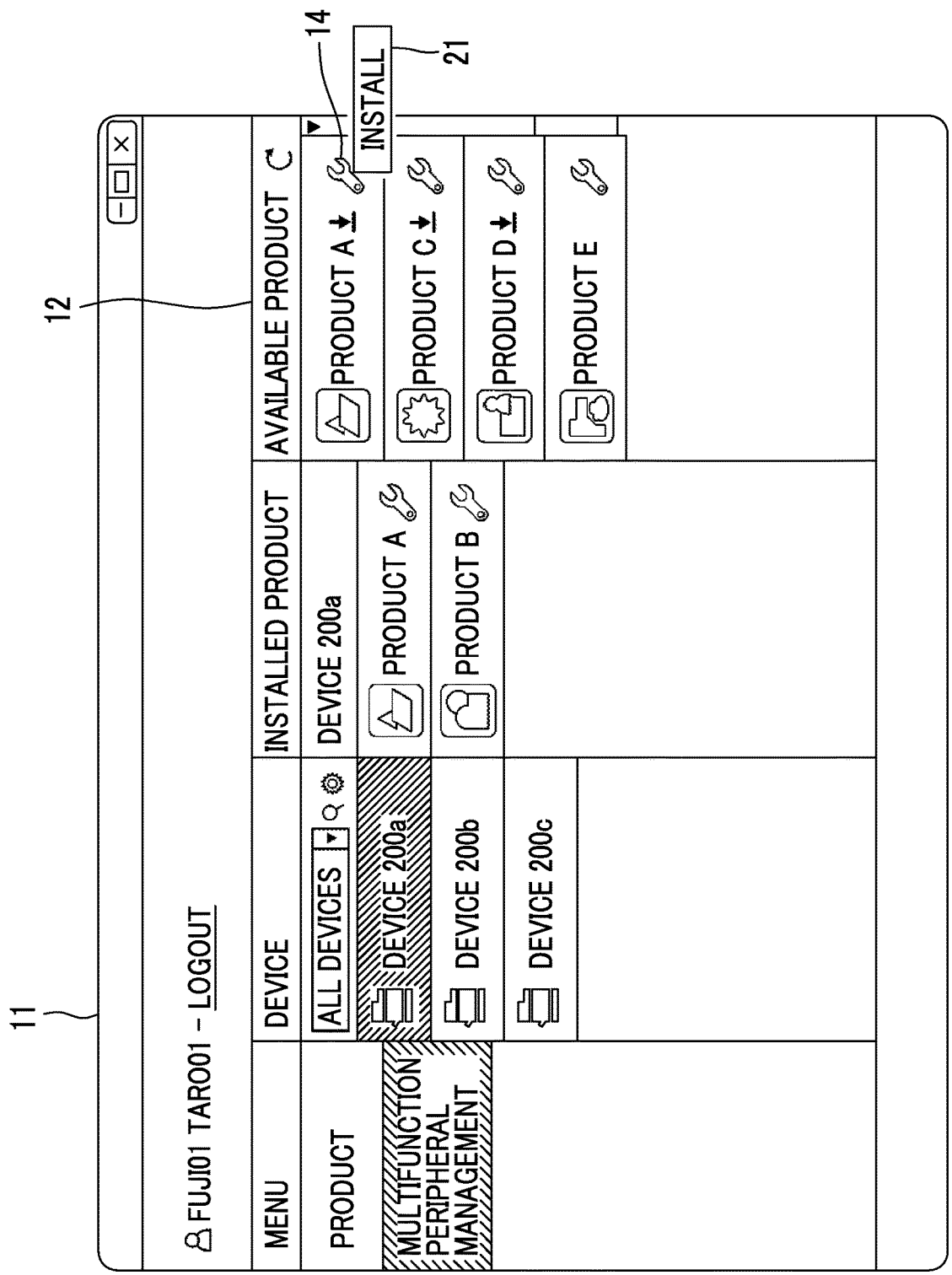
FIG. 10 is a diagram illustrating an example of the screen displayed on the management terminal.
Figure 11:
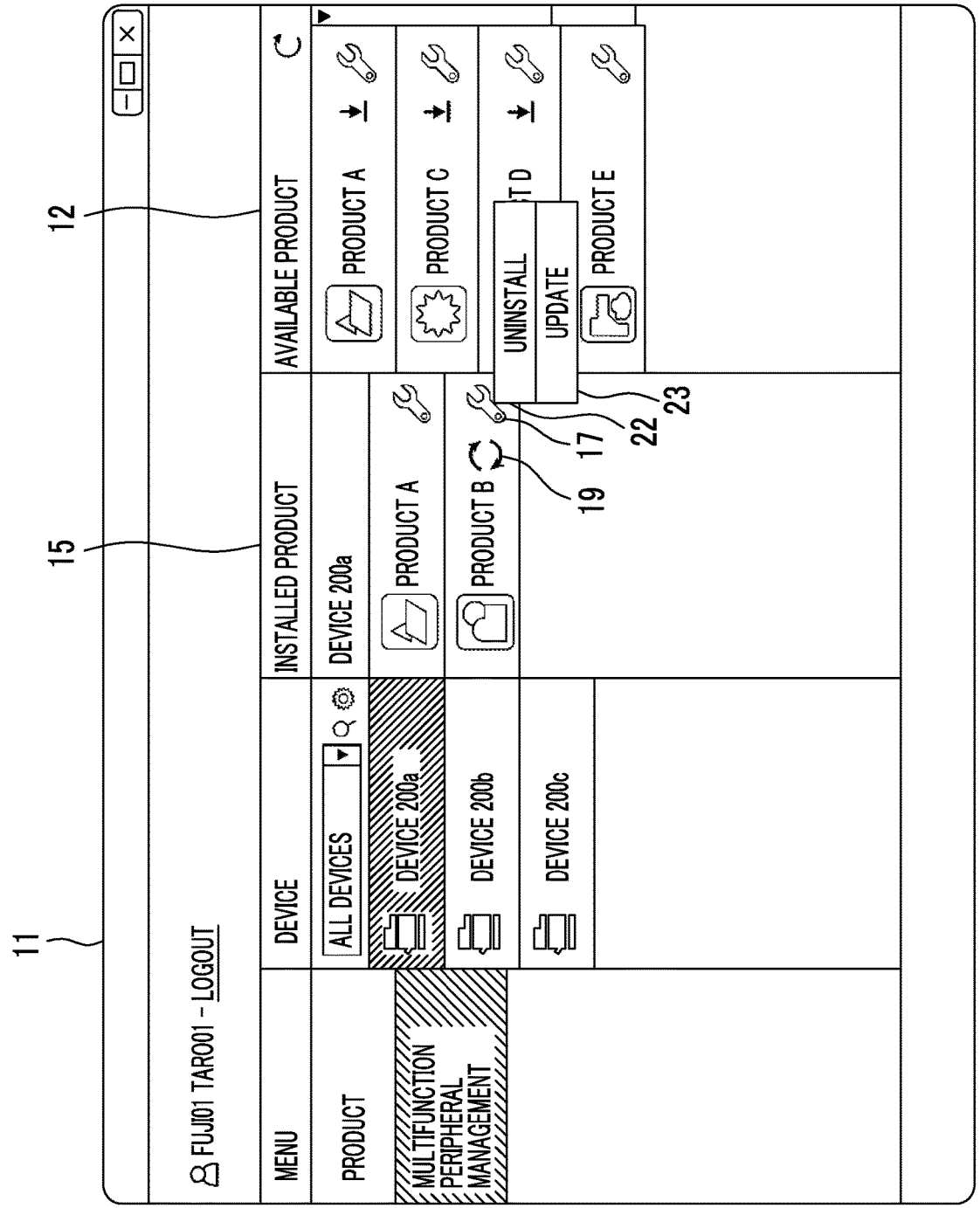
FIG. 11 is a diagram illustrating an example of the screen displayed on the management terminal.

Next, the screen displayed on the display or the like of the management terminal 100 will be described. FIGS. 9 to 11 are diagrams illustrating examples of the screens displayed on the management terminal 100. The screens 11 shown in FIGS. 9 to 11 are screens displayed by the operator performing an operation of logging in to the management application.

First, the display area 12 on the screen 11 will be described.

In the display area 12, available products are displayed in a list. In the display area 12, products within the provision period, except the products of which provision period has expired, among the available products acquired from the information management server 300, are displayed in a list.

For example, in the example shown in FIG. 9, it is assumed that the product A is a product within the provision period and the product B is a product within the maintenance period after the provision period has expired. In this case, the information on the available products transmitted from the information management server 300 includes both the product A and the product B. However, in the display area 12, as shown in FIG. 9, the information on the product A within the provision period is displayed, but the product B of which the provision period has expired is not displayed and is hidden.

Further, each product in the display area 12 is provided with a "download" button 13 for downloading the product to the device 200. In a case where the operator selects the "download" button 13 of any product, a process of downloading the installer of the product from the information management server 300 to the management terminal 100 is performed. Here, like the product E, in a case where the process of downloading the installer is completed, the "download" button 13 may be hidden.

In each product in the display area 12, a processing button 14 for performing a process on the product is provided. In a case where the operator selects the processing button 14 of any product, for example, the item of "installation" is displayed as a process related to the product.

FIG. 10 shows an example in which the item 21 of "installation" is displayed by selecting the processing button 14 of the product A. The item 21 of "installation" is activated by selecting the "download" button 13 of the product A and downloading the installer of the product A, and may be selected by the operator. Further, in a case where the operator selects the item 21 of "installation", the installation operation control section 117 activates the installer of the product A and instructs the device 200a to install the product A.

Next, the display area 15 on the screen 11 will be described.

In the display area 15, products installed on the device 200 selected by the operator are displayed in a list. In the display area 15, products that are installed on the device 200 selected by the operator, products within the provision period, and products within the maintenance period after the provision period has expired are displayed in a list.

For example, in the example shown in FIG. 9, a device 200a, a device 200b, and a device 200c are displayed in the display area 16, as the device 200 managed by the management application of the management terminal 100. For example, in a case where the operator selects the device 200a among these three devices 200, the device information acquisition section 113 acquires various types of information on the selected device 200a, from the device 200a. The display control section 115 compares the list of available products acquired from the information management server 300 with various types of information on the device 200a acquired from the device 200a to display a list of products installed on the device 200a on a display area 15.

In each product in the display area 15, a processing button 17 for performing a process on the product is provided. In a case where the operator selects the processing button 17 of any product, for example, the item of "uninstall" and the item of "update" are displayed as a process related to the product.

FIG. 11 shows an example in which the item 22 of "uninstall" and the item 23 of "update" are displayed by selecting the processing button 17 of the product B. In this example, a case where both the item 22 of "uninstall" and the item 23 of "update" are activated is shown. Further, in a case where the "update" menu is activated, an "update" button 19 is also newly displayed.

The item of "uninstall" of each product is activated by the process of step S308 in FIG. 7 and may be selected by the operator. In addition, the item of "update" of each product is activated by making an affirmative determination (YES) in the determination of step S409 in FIG. 8A, and it may be selected by the operator.

Here, for example, in a case where the operator selects the item 22 of "uninstall", the installation operation control section 117 activates the installer of the product B and instructs the device 200a to uninstall the product B. In a case where the installer of the product B is not stored, it is acquired from the information management server 300 in the background. In a case where the process of uninstalling the product B from the device 200a is completed, the product B is deleted from the list in the display area 15. Since the product B is a product within the maintenance period, the installation operation control section 117 deletes the installer of the product B. In this manner, the uninstallation process is performed on the product B within the maintenance period.

Since the product B within the maintenance period is not displayed in the display area 12, in a case where the product B is uninstalled, the operator may not download or install the product B again, by selecting the "download" button 13 of the product B or the item 21 of "installation" of the product B. On the other hand, for example, since the product A within the provision period is displayed in the display area 12, even in a case where the product A is uninstalled, the operator may download or install the product A again, by selecting the "download" button 13 of the product A or the item 21 of "installation" of the product A.

Further, for example, by the operator selecting the item 23 of "update" or the "update" button 19, in a case where there is a successor product of the product B, the installation operation control section 117 explicitly acquires the installer of the successor product. Then, it activates the installer of the acquired successor product and instructs the device 200a to update the product B to the successor product. In a case where there is no successor product of the product B, the installation operation control section 117 acquires the installer of the product B in the background. Then, it activates the acquired installer and instructs the device 200a to update the product B to a new version.

Figure 12:
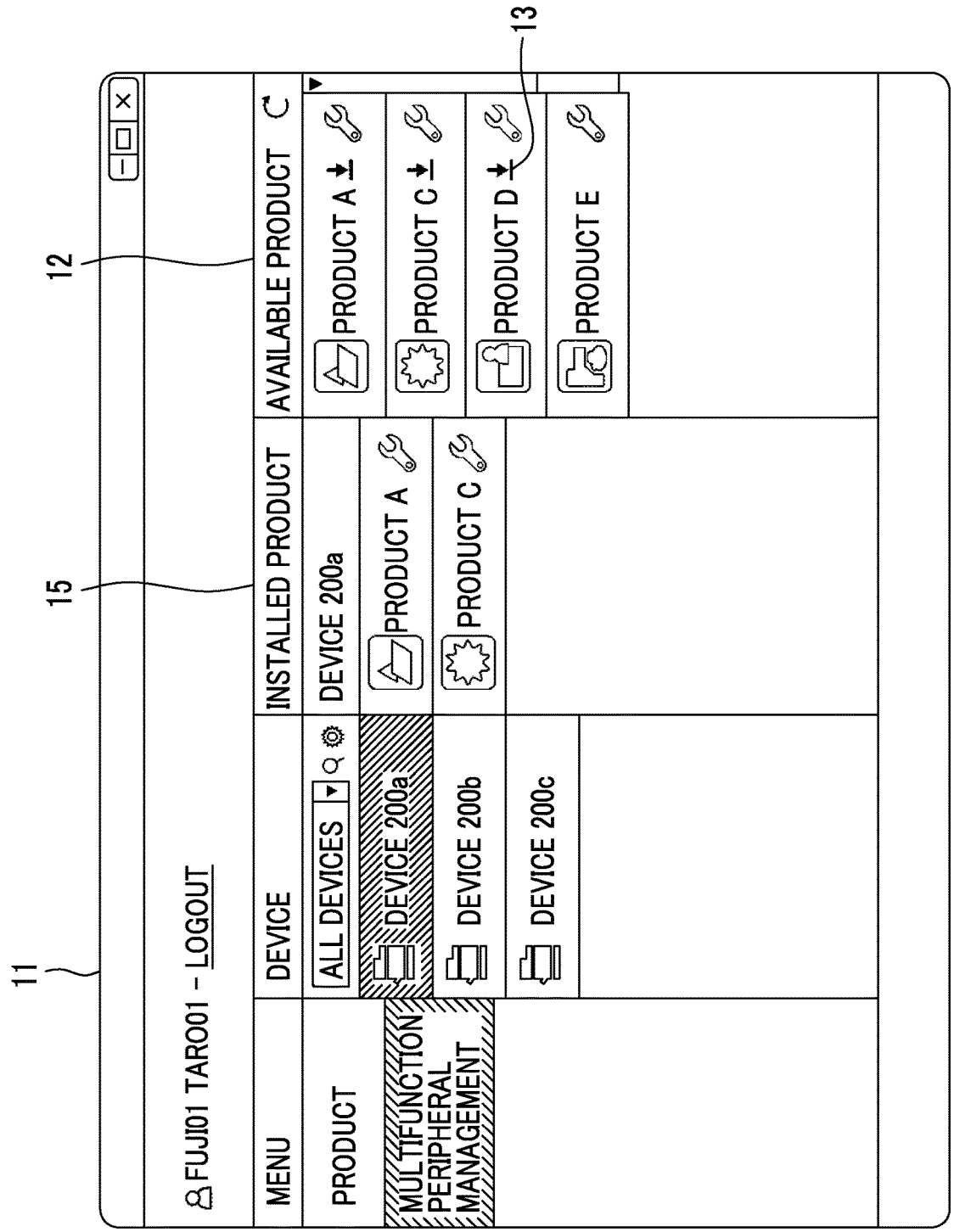
FIG. 12 is a diagram illustrating an example of a screen after an update to a successor product is performed.

FIG. 12 is a diagram illustrating an example of a screen after an update to a successor product is performed. In the example shown in FIG. 12, it is assumed that the successor product of the product B is the product C. In this case, by updating the product B, the product B is uninstalled from the device 200a, and the product C is newly installed. In the display area 15, the information on the product B is replaced with the information on the product C. Further, since the product C is a product within the provision period, the installation operation control section 117 stores the installer of the product C in the installer storage section 114 without deleting it.

Since the product C is newly installed, the "download" button 13 of the product C in the display area 12 may be inactivated.

In addition, in a case where the product B is updated to a new version, the product B remains displayed in the display area 15. In this case, the item 23 of "update" and the "update" button 19 may be inactivated. Since the product B is a product within the maintenance period, the installation operation control section 117 deletes the installer of the product B.

In this manner, the update process is performed on the product B within the maintenance period.

Figure 13:
FIG. 13 is a diagram illustrating an example of a screen of detailed information on installed products.

Next, a screen illustrating detailed information on products installed on the device 200 will be described. In a case where the operator selects a product in the list of installed products, detailed information on the selected product is displayed. FIG. 13 is a diagram illustrating an example of a screen of detailed information of installed products. The screen 31 shown in FIG. 13 is a screen displayed, for example, in a case where the operator selects the display area 18 of the product B (hatched area in FIG. 9).

On the screen 31, information on "information on installed products", "available product information", "description", and "supported model" is displayed for the product B.

In the "information on installed products", the version of the product B installed on the device 200a is indicated. In other words, the "information on installed products" is information obtained from the device 200a.

Next, "available product information" indicates the latest version of available product B and the release date of the version. "Description" indicates a description of the product B. Further, the "supported model" indicates the model of the device 200 corresponding to the product B (that is, the model of the device 200 capable of installing the product B). In other words, the "available product information", "description", and "supported model" are information obtained from the information management server 300.

Further, the "uninstall" button 32 is also displayed on the screen 31. The "uninstall" button is activated by the process of step S308 in FIG. 7, similarly to the item 22 of "uninstall" (see FIG. 11), and it may be selected by the operator.

As described above, the management terminal 100 according to the present exemplary embodiment displays information on products of which the provision period has not expired, as a list of available products, while hiding the products of which the provision period has expired. Further, the management terminal 100 displays not only the products of which the provision period has not expired but also the product within the maintenance period of which the provision period has expired, as a list of the products installed on the device 200.

For example, in a case where a new product is no longer provided in the information management server 300, the management terminal 100 hides the product in the list of available products, so the operator's operation of downloading or installing the product is not performed on the screen of the management terminal 100. On the other hand, for example, even in a case where the products installed on the device 200 are not newly provided by the information management server 300, the products are displayed on the screen of the management terminal 100 in a case where the products are within the maintenance period. Therefore, operations for performing a predetermined process such as uninstallation or update is performed on the screen of the management terminal 100.

In the example described above, the information on the products of which the provision period has expired is hidden, in the list of available products, but the present invention is not limited to such a configuration. In the present exemplary embodiment, an indication for prohibiting or restricting the download of the installer or the installation of the product may be displayed, with respect to the product of which provision period has expired. For example, the information on the product of which provision period has expired may be grayed out such that the operation by the operator is not received.

Further, for example, in a case where the operator selects a product of which provision period has expired, a warning that it is not allowed to download the installer or a warning that it is not allowed to install the product may be displayed. In other words, in the present exemplary embodiment, for example, it may be assumed that the display mode of the product of which the provision period has expired is displayed in a mode different from the display mode of the product within the provision period, for the download of the installer or the installation of the product.

Further, in the above-described example, in the case where there is a successor product with respect to the product to be updated, the product to be updated is replaced with the successor product, but the present invention is not limited to such a configuration. For example, the successor product may be newly installed while leaving the product to be updated on the device 200 without uninstalling it.

Furthermore, in the above-described example, in updating of the product installed on the device 200, even in a case where there is a newer version than the installed version, in a case where there is a successor product, the update is made to the successor product, but the present invention is not limited to such a configuration. For example, even in a case where there is a successor product, in a case where there is a newer version than the installed version, update may be performed to a newer version.

Further, for example, the operator may select whether to perform update to a new version or update to a successor product. In this case, for example, the operator may set in advance which update is to be performed, and update may be performed based on the preset setting. Further, for example, after the operator selects the item of "update", the operator may be allowed to select which update to be performed on the screen. Further, for example, as the item of "update", an item for updating to a new version and an item for updating to a successor product may be provided to receive an operation for any item.

Further, in the above-described example, the information management server 300 extracts products that may be used by the operator who logs in to the management application, and transmits the information on the extracted products to the management terminal 100, but the present invention is not limited to such a configuration. For example, regardless of the information on the logged-in operator, the information management server 300 may transmit to the management terminal 100 information on all available products, in other words, information on all products that the information management server 300 may provide.

In this case, based on the information acquired from the information management server 300, the management terminal 100 does not display the information on the products within the maintenance period, among all the products that the information management server 300 may provide, and displays products within the provision period in the list. In addition, the management terminal 100 displays products installed on the device 200 in a list, among all the products that may be provided by the information management server 300, as products installed on the device 200.

Further, the program realizing the exemplary embodiment of the present invention may be provided not only by a communication unit but also by being stored in a recording medium such as a CD-ROM.

Although various exemplary embodiments and modifications have been described above, it goes without saying that these exemplary embodiments and modification examples may be combined.

Further, the present disclosure is not limited to the above exemplary embodiment at all, and may be implemented in various forms without departing from the gist of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
display a first list which is a list of available software and a second list which is a list of software installed on a target device; and
receive an instruction operation of installing the software displayed in the first list on the target device and an instruction operation of performing a predetermined process on the installed software displayed in the second list,
wherein the processor continues to display the software in the second list, in a case where the software included in the second list is no longer newly provided, and the processor does not display the software in the first list or displays a fact that it is not allowed to install the software, in a case where the software included in the first list is no longer newly provided,
wherein the predetermined process is a process of updating the installed software displayed in the second list,
the processor is configured to, in a case where the processor receives an instruction to update one piece of software which is displayed in the second list and is no longer newly provided, perform a process of installing different software which succeeds the one piece of software and is newly provided on the target device.

2. The information processing apparatus according to claim 1,
wherein the predetermined process is a process of uninstalling the installed software displayed in the second list,
the processor is configured to, in a case where the processor receives an instruction to uninstall one piece of software which is displayed in the second list and is no longer newly provided, perform a process of uninstalling the one piece of software by using an uninstaller which is software for executing uninstallation and is acquired from a different device.

3. The information processing apparatus according to claim 2,
wherein the uninstaller has a function of uninstalling the one piece of software, and
wherein the processor deletes the uninstaller after the process of uninstalling the one piece of software is completed.

4. The information processing apparatus according to claim 1,
wherein the different software is displayed in the first list by the processor.

5. The information processing apparatus according to claim 1,
wherein in a case of performing the process of installing the different software, the processor acquires a first installer which is software for performing the process from another device, and performs the process of installing the different software by using the acquired first installer, and in a case of performing the process of updating, the processor acquires a second installer which is software for performing the process from another device, and performs the process of updating by using the acquired second installer.

6. The information processing apparatus according to claim 5,
wherein in a case where the processor acquires the first installer, the processor displays a fact that the first installer is acquired, and in a case where the processor acquires the second installer, the processor does not display a fact that the second installer is acquired.

7. The information processing apparatus according to claim 5,
wherein the processor does not delete the first installer after completion of the process of installing the different software and deletes the second installer after completion of the update process.

8. The information processing apparatus according to claim 1,
wherein the case where the software is no longer newly provided is a case where a predetermined period has elapsed as a period for newly providing the software.

9. The information processing apparatus according to claim 8,
wherein the case where the software is no longer newly provided is a case within a period which is predetermined as a period during which a normal operation of the software is guaranteed after the predetermined period has elapsed.

10. The information processing apparatus according to claim 1,
wherein the processor is configured to:
in a case where the different software which succeeds the one piece of software and is newly provided on the target device does not exist, perform a process of updating the one piece of software.

11. A non-transitory computer readable medium storing a program causing a hardware computer to realize function of:
outputting data for displaying a first list which is a list of available software and a second list which is a list of software installed on a target device on a display section; and
receiving an instruction operation of install the software displayed in the first list on the target device and an instruction operation of performing a predetermined process on the installed software displayed in the second list,
wherein the hardware computer continues to display the software in the second list, in a case where the software included in the second list is no longer newly provided, and the hardware computer does not display the software in the first list or outputs data for displaying a fact that it is not allowed to install the software, in a case where the software included in the first list is no longer newly provided,
wherein the predetermined process is a process of updating the installed software displayed in the second list,
the hardware computer is configured to realized function of, in a case where the hardware computer receives an instruction to update one piece of software which is displayed in the second list and is no longer newly provided, performing a process of installing different software which succeeds the one piece of software and is newly provided on the target device.

12. The information processing apparatus according to claim 11,
wherein the hardware computer is configured to realized function of, in a case where the different software which succeeds the one piece of software and is newly provided on the target device does not exist, performing a process of updating the one piece of software.

13. An information processing apparatus comprising:
a processor for displaying to a display a first list which is a list of available software and a second list which is a list of software installed on a target device; and
a panel for receiving an instruction operation of installing the software displayed in the first list on the target device and an instruction operation of performing a predetermined process on the installed software displayed in the second list,
wherein the processor continues to display the software in the second list, in a case where the software included in the second list is no longer newly provided, and the processor does not display the software in the first list or displays a fact that it is not allowed to install the software, in a case where the software included in the first list is no longer newly provided,
wherein the predetermined process is a process of updating the installed software displayed in the second list,
the processor is configured to, in a case where the panel receives an instruction to update one piece of software which is displayed in the second list and is no longer newly provided, perform a process of installing different software which succeeds the one piece of software and is newly provided on the target device.

14. The information processing apparatus according to claim 13,
wherein the processor is configured to:
in a case where the different software which succeeds the one piece of software and is newly provided on the target device does not exist, perform a process of updating the one piece of software.

* * * * *